US012709816B2

(12) United States Patent
Naskar et al.

(10) Patent No.: US 12,709,816 B2
(45) Date of Patent: Aug. 18, 2026

(54) CARBON FIBER REINFORCED COMPOSITES AND METHOD FOR MAKING SAME

(71) Applicant: UT-Battelle, LLC, Oak Ridge, TN (US)

(72) Inventors: Amit K. Naskar, Knoxville, TN (US); Zeyang Yu, Knoxville, TN (US); Xinzhang Zhou, Knoxville, TN (US); Christopher C. Bowland, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 18/373,628

(22) Filed: Sep. 27, 2023

(65) Prior Publication Data

US 2024/0218550 A1 Jul. 4, 2024

Related U.S. Application Data

(60) Provisional application No. 63/432,429, filed on Dec. 14, 2022.

(51) Int. Cl.
*C25D 9/02* (2006.01)
*C08J 5/04* (2006.01)
(Continued)

(52) U.S. Cl.
CPC ................ *C25D 9/02* (2013.01); *C08J 5/042* (2013.01); *C25D 5/48* (2013.01); *C25D 5/54* (2013.01);
(Continued)

(58) Field of Classification Search
CPC .. D06M 14/06; D06M 15/03; D06M 2101/40; D06M 13/325; D06M 13/415;
(Continued)

(56) References Cited

U.S. PATENT DOCUMENTS 4,070,446 A 1/1978 Horikiri et al.
8,221,840 B2 7/2012 Sugiura et al.
(Continued)

FOREIGN PATENT DOCUMENTS

CN 113969498 A * 1/2022 ................ C08J 5/06

OTHER PUBLICATIONS

"CN113969498_Machine Translation" is a machine translation of CN-113969498-A. (Year: 2022).*
(Continued)

*Primary Examiner* — Larissa Rowe Emrich
(74) *Attorney, Agent, or Firm* — Scully, Scott, Murphy & Presser, P.C.

(57) ABSTRACT

A surface-modified carbon fiber composition comprising: (i) a carbon fiber having an outer surface, a width of at least 1 micron, and a length-to-width aspect ratio of at least 1000; and (ii) an amine-containing polymer coating bonded to the outer surface of the carbon fiber, wherein the amine-containing polymer contains at least one of primary and secondary amino groups. A method for producing the coated carbon fiber comprises: immersing an uncoated carbon fiber in an electrolyte solution containing a dissolved amount of an amine-containing polymer containing at least one of primary and secondary amino groups while the uncoated carbon fiber is connected to a negatively charged electrode and positioned adjacent to a positively charged electrode in the electrolyte solution to result in the electrodeposition of a coating of the amine-containing polymer on the uncoated carbon fiber. Also described herein are carbon fiber-polymer composites and methods of producing them.

23 Claims, 11 Drawing Sheets

Chitin: R=NHAc
Chitosan: R=$NH_2$

(51) Int. Cl.
*C25D 5/48* (2006.01)
*C25D 5/54* (2006.01)
*C25D 21/12* (2006.01)
*D06M 15/03* (2006.01)
*D06M 101/40* (2006.01)

(52) U.S. Cl.
CPC ............. *C25D 21/12* (2013.01); *D06M 15/03* (2013.01); *D06M 2101/40* (2013.01)

(58) Field of Classification Search
CPC ........ D06M 11/59; D06M 11/62; C08J 5/042; C08K 7/06; C08K 9/04; C08K 9/08; C25D 9/02; D01F 11/10–16
See application file for complete search history.

(56) References Cited

U.S. PATENT DOCUMENTS 9,528,197 B2 12/2016 Naskar
9,725,829 B2 8/2017 Naskar et al.
9,732,445 B2 8/2017 Rios et al.
2015/0210811 A1* 7/2015 Hong .................... B82Y 40/00 523/435
2018/0023244 A1* 1/2018 Yurchenko ............. D01F 11/14 442/60
2019/0256672 A1* 8/2019 Bowland .................. C08K 7/06

OTHER PUBLICATIONS

Arnold, C.L., et al., "Enhancing interfacial shear strength via surface grafting of carbon fibers using the Kolbe decarboxylation reaction", Composites Science and Technology (2018), pp. 135-141, 159.
Athavale, R. et al., "Tuning the surface charge properties of chitosan nanoparticles", Materials Letters, 2022, pp. 1-3, 308.
Batista, M. D. R., et al., "Carbon fiber/epoxy matrix composite interphases modified with cellulose nanocrystals", Composites Science and Technology (2018), pp. 274-281, 164.
Bowland, C.C., et al., "Passive sensing of a microparticle modified hybrid, fiber-reinforced composite", Proc Spie. vol. 11592 (2021), 12 pages.
Chen, X. D et al., "Electrochemical Activity and Damage of Single Carbon Fiber", Materials 2021, pp. 1-20, 14, 758.
Chu, C., et al., "Synergistic effect of nano-SiO2 and small-sized graphene oxide on carbon fiber/epoxy composite", Polymer Composites, 2019, pp. 4588-4596, 40(12).
Diab, M.A., et al., "Thermal stability and degradation of chitosan modified by cinnamic acid", Open Journal of Polymer Chemistry, 2012, pp. 14-20, 2.
Eyckens, D. J., et al., "Improving the effects of plasma polymerization on carbon fiber using a surface modification pretreatment", Composites Part A (2021), pp. 1-10, 143, 106319.
Fu, Y., et al., Enhancing the interfacial properties of high-modulus carbon fiber reinforced polymer matrix composites via electrochemical surface oxidation and grafting, Composites Part A (2020), pp. 1-11, 130, 105719.
Gangineni, P. K., et al., "Mechanical behavior of Graphene decorated carbon fiber reinforced polymer composites: An assessment of the influence of functional groups", Composites Part A, pp. 36-44 (2019), 122.
Goy, R. C., et al., "A Review of the Antimicrobial Activity of Chitosan", Polimeros: Ciencia e Tecnologia, 2009, pp. 241-247, 19(3).
Gulyas, J., et al., "Electrochemical oxidation of carbon fibres: Surface chemistry and adhesion", Composites Part A, 2001, pp. 353-360, 32.
Hu, C.T., et al., "Electrochemical grafting of poly(glycidyl methacrylate) on a carbon-fibre surface", Rsc Adv. 10(18), 10599-10605.
Jiang, J. J., et al., "Preparation of Graphene Oxide Coatings onto Carbon Fibers by Electrophoretic Deposition for Enhancing Interfacial Strength in Carbon Fiber Composites", J Electrochem Soc. (2016), pp. D133-D139, 163(5).
Kumar, M.N.V.R, "A review of chitin and chitosan applications", Reactive & Functional Polymers (2000), pp. 1-27 46 (1).
Lee, Y. M., et al., "Highly improved interfacial affinity in carbon fiber-reinforced polymer composites via oxygen and nitrogen plasma-assisted mechanochemistry", Composites Part B (2019), pp. 725-732, 165.
Liu, J., et al., "A surface treatment technique of electrochemical oxidation to simultaneously improve the interfacial bonding strength and the tensile strength of PAN-based carbon fibers", Materials Chemistry and Physics (2010), pp. 548-555, 122.
Ma, Y.Y., et al., "Enhanced interfacial properties of carbon fiber reinforced polyamide 6 composites by grafting graphene oxide onto fiber surface", Applied Surface Science (2018), pp. 286-298, 452.
Ma, Z., et al., "Oxidative Degradation of Chitosan to the Low Molecular Water-Soluble Chitosan over Peroxotungstate as Chemical Scissors", Plos One, Jun. 2014, pp. 1-7, e100743, vol. 9, Issue 6.
Nam, Y.S., et al., "Effect of the degree of deacetylation on the thermal decomposition of chitin and chitosan nanofibers", Carbohydrate Polymers(2010), pp. 291-295, 80.
Osbeck, S., et al., "Effect of an ultraviolet/ozone treatment on the surface texture and functional groups on polyacrylonitrile carbon fibres", Carbon (2011), pp. 4322-4330, 49.
Pamula, E., et al., "Bulk and surface chemical functionalities of type III PAN-based carbon fibres", Carbon (2003), pp. 1905-1915, 41.
Park, S-J., et al., "Effect of different cross-section types on mechanical properties of carbon fibers-reinforced cement composites", Materials Science and Engineering (2004), pp. 348-355, A366.
Qin, W. Z., et al., "Modifying the carbon fiber-epoxy matrix interphase with silicon dioxide nanoparticles", RSC Adv, 2015, pp. 2457-2465, 5.
Servinis, L., et al., "Electrochemical surface modification of carbon fibres by grafting of amine, carboxylic and lipophilic amide groups", Carbon (2017), pp. 393-403, 118.
Sharma, M., et al., "Carbon fiber surfaces and composite interphases", Composites Science and Technology (2014), pp. 35-50, 102.
Sharma, S. P., et al., "Comparative study of the effect of fiber surface treatments on the flexural and interlaminar shear strength of carbon fiber-reinforced composites", Materials Today Communications (2020), pp. 1-10, 24, 101016.
Shukla, S. K., et al., "Chitosan-based nanomaterials: A state-of-the-art review", International Journal of Biological Macromoleclues, 46-58 (2013), 59.
Simchi, A., et al., "Electrophoretic deposition of chitosan", Materials Letters (2009), pp. 2253-2256, 63.
Sogias, I.A., et al., "Exploring the Factors Affecting the Solubility of Chitosan in Water", Macromolecular Chemistry and Physics (2010), pp. 426-433, 211(4).
Szymanska, E., et al., "Stability of Chitosan-A Challenge for Pharmaceutical and Biomedical Applications", Marine Drugs (2015), pp. 1819-1846, 13.
Tran, N.T., et al., "Electrochemical Surface Treatment of Discontinuous Carbon Fibers", Langmuir, (2019), pp. 12374-12388, 35.
Vasilev, A. et al., "Thermal behavior of chitosan as a carbon material precursor under IR radiation", IOP Conference Series: Materials Science and Engineering, (2019), pp. 1-10, 693, 012002.
Wang, S., et al., "Synergy of electrochemical grafting and crosslinkable crystalline sizing agent to enhance the interfacial strength of carbon fiber/PEEK composites", Composites Science and Technology, (2021), pp. 1-8, 203, 108562.
Wen, Z., et al., "A two-step carbon fiber surface treatment and its effect on the interfacial properties of CF/EP composites: The electrochemical oxidation followed by grafting of silane coupling agent", Applied Surfance Science (2019), pp. 546-554, 486.
Wen, Z., et al., "Electrochemical polymerization of carbon fibers and its effect on the interfacial properties of carbon reinforced epoxy resin composites", Composites Part A (2019), pp. 21-29, 119.

(56) References Cited

OTHER PUBLICATIONS

Yao, X.M., et al., "Comparison of carbon nanotubes and graphene oxide coated carbon fiber for improving the interfacial properties of carbon fiber/epoxy composites", Composites Part B (2018), pp. 170-177, 132.

Yu, Z., et al., "Chitin- and cellulose-based sustainable barrier materials: a review", Emergent Materials (2020), pp. 919-936, 3.

Zabihi, O., et al., "Carbon fibre surface modification using functionalized nanoclay: A hierarchical interphase for fibre-reinforced polymer composites", Composites Science and Technology (2017), pp. 49-58, 148.

Zhandarov, S., et al., "Investigation of interfacial strength parameters in polymer matrix composites: Compatibility and reproducibility", Advanced Industrial and Engineering Polymer Research (2018), pp. 82-92, 1.

Zhang, M., et al., "Enhanced Interfacial Properties of High-Modulus Carbon Fiber Reinforced PEKK Composites by a Two-Step Surface Treatment: Electrochemical Oxidation Followed by Thermoplastic Sizing", Applied Composite Materials (2022), pp. 745-764, 29.

* cited by examiner

Chitin: R=NHAc
Chitosan: R=$NH_2$

CARBON FIBER REINFORCED COMPOSITES AND METHOD FOR MAKING SAME

CROSS-REFERENCE TO RELATED APPLICATIONS

The present application claims benefit of U.S. Provisional Application No. 63/432,429, filed Dec. 14, 2022, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to coated carbon fibers and composites containing carbon fibers. The present invention is more particularly directed to continuous carbon fibers and continuous feed-through processes for coating them, particularly by electrodeposition.

BACKGROUND

Carbon fibers (CFs) have been widely utilized to fabricate lightweight, high-strength, and high toughness composites which are desirable in the aerospace and automotive sectors. The mechanical properties of a CF-reinforced composite are fundamentally determined by the intrinsic properties of the fiber and the interfacial bonding strength of the fiber with polymer matrix. The CFs without appropriate surface treatment usually carry only a few active surface functional groups with relatively smooth surface morphologies resulting in low surface wettability by a polymer matrix. These characteristics lead to low interfacial bonding strength and poor performance under an applied stress.

Although sizing agents have long been applied onto the surfaces of CFs to improve their interfacial bonding strengths with a matrix in which they are incorporated, substantial variations are often present in the interactions between the CF, sizing agent, and matrix, which compromises the integrity of the composite in various applications. Carbon fiber-matrix composites may experience sudden, catastrophic failure when exposed to sufficient stress levels and provide no visual indication of damage before they fail. Thus, the quality and uniformity of the bonding between the polymer matrix and its reinforcing fibers play a key role in performance of the composites made thereof. Given the importance of the interfacial interactions, there would be a significant benefit in sizing agents that provide better and more uniform interfacial interactions. There would also be a significant benefit in a method that could deposit such sizing agents in a uniform manner to result in more uniform and reliable bonding with a matrix.

SUMMARY

In one aspect, the present disclosure is directed to a surface-modified carbon fiber (CF) composition in which the surface of the CF is bonded to an amine-containing polymer coating (sizing agent) containing at least one of primary and secondary amino groups, such as chitosan or polyethyleneimine. The amine-containing polymer coating is typically no more than or less than 10, 5, 2, 1, or 0.5 micron(s) in thickness. The CF typically has an outer surface, a width of at least 1 micron, and a length-to-width aspect ratio of at least 1000, and may be a continuous CF (typically having a length of at least or more than 1, 2, 3, 4, or 5 meters) or a chopped CF (typically having a length of at least or more than 1, 2, or 5 mm and up to 1, 2, 5, or 10 cm, or a length within a range of 0.1-10 cm). The sizing agent described herein advantageously provides substantially uniform high strength interfacial interactions.

In another aspect, the present disclosure is directed to methods of producing the surface-modified CF described. The amine-containing polymer may be coated onto the CF by any of the known coating methods, e.g., applying a solution containing the amine-containing polymer onto the CF by dip coating, spraying, or brushing. However, in particular embodiments, the amine-containing polymer is coated onto the CF by an electrodeposition process. The electrodeposition method has herein been found to deposit the amine-containing sizing agent in a more uniform manner, which results in more uniform and reliable bonding with a matrix. The electrodeposition process may more specifically entail immersing an uncoated (surface treated or untreated) CF in an electrolyte solution containing a dissolved amount of an amine-containing polymer containing at least one of primary and secondary amino groups while the uncoated CF is connected to a negative electrode and positioned adjacent to a positively charged electrode in the electrolyte solution to result in the electrodeposition of a coating of the amine-containing polymer on the uncoated CF. The amine-containing polymer in the electrolyte solution is preferably in a protonated (cationic) state, which can be achieved by maintaining the pH of the electrolyte solution to an appropriately low (acidic) value. In some embodiments, the uncoated CF is not subjected to a surface treatment (e.g., oxidation) prior to the electrodeposition of the amine-containing polymer on the CF. In embodiments, after electrodeposition of the amine-containing polymer onto the CF, the surface-modified CF is washed to remove excess amine-containing polymer from the CF. The CF and the amine-containing polymer used in the method can be any of those described above or elsewhere in this disclosure. In some embodiments, the electrolyte solution has a pH within a range of 2-6. In further or separate embodiments, the electrodeposition may be conducted using an electrical current within a range of 1.5 to 30 $A/m^2$, or 1.5 to 15 $A/m^2$, or 1.5 to 6 $A/m^2$. In further or separate embodiments, the electrodeposition may be conducted for a period of time within a range of 5-120 seconds. In further or separate embodiments, the electrolyte solution contains 0.001-5 wt %, 0.001-2 wt %, or 0.01-1 wt % concentration of the amine-containing polymer.

In another aspect, the present disclosure is directed to a carbon fiber composite material containing surface-modified carbon fibers, as described above, homogeneously incorporated into a polymer matrix. The polymer matrix may be, for example, an epoxy, polyester, vinyl ester, nylon, rubber, or polysiloxane matrix. In another aspect, the invention is directed to a method of producing the carbon fiber composite described above. The method includes homogeneously mixing the surface-modified carbon fibers and matrix polymer, such as by melt mixing or melt compounding, followed by cooling and/or optional curing, if applicable.

BRIEF DESCRIPTION OF THE FIGURES

In FIG. 5*b*, the column bar with dashed border represents the CFs that were treated electrochemically without CS in suspension.

In FIG. 7*a*, the matrix is EPON 862/Curing agent W; in FIG. 7*b*, the matrix is a commercial biobased epoxy (CS coated: The CF coated with chitosan at pH 4.5, 0.1 A, 45 s electrodeposition condition).

DETAILED DESCRIPTION

Figure 1:
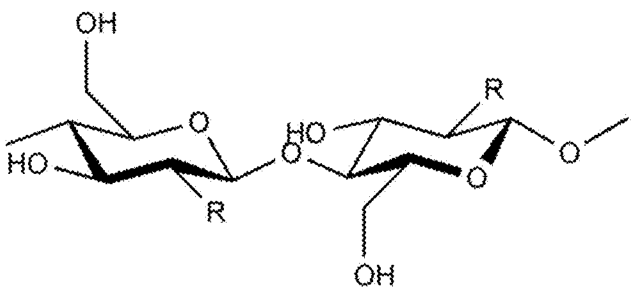
FIG. 1 shows the chemical structure of chitin and chitosan.

In a first aspect, the invention is directed to a coated carbon fiber (coated CF) in which a carbon fiber has an amine-containing polymer coating bonded to the surface (i.e. outer surface, which defines the contours) of the carbon fiber. In embodiments, the carbon fiber is any of the high strength continuous carbon fibers well known in the art. Continuous carbon fibers and methods of producing them are described in detail in, for example, U.S. Pat. Nos. 9,732,445, 9,725,829, 9,528,197, 8,221,840, and 4,070,446, and X. Huang, *Materials* (*Basel*), 2(4):2369-2403, December 2009, the entire contents of which are herein incorporated by reference in their entirety. The carbon fiber may also be a chopped version of a continuous fiber. Some examples of carbon fiber compositions include those produced by the pyrolysis of polyacrylonitrile (PAN), viscose, rayon, pitch, lignin, and polyolefin fiber precursors. As well known in the art, the carbon fiber is generally produced by a process in which a carbon fiber precursor (such as any of those mentioned above) is subjected to a stabilization step before a carbonization step. The carbon fiber considered herein generally possesses a high tensile strength, such as at least 500, 1000, 2000, 3000, 5000, 8,000, or 10,000 MPa, with a degree of stiffness generally of the order of steel or higher (e.g., 100-1000 GPa). The term "carbon fiber," as used herein, also includes carbon tapes, as well known in the art. The carbon fiber is made predominantly (e.g., at least 90, 95, 98, 99 or 100%) of elemental carbon, but minor amounts of some non-carbon species (e.g., nitrogen, phosphorus, boron, or silicon) may or may not be present, generally in amounts up to or less than 10, 5, 2, or 1 wt %.

As known in the art, the carbon fiber has its length dimension longer than its width dimension. The ratio of the length to the width is commonly referred to as the "aspect ratio" of the carbon fiber. The carbon fiber typically has an aspect ratio of at least or greater than 1000. In some embodiments, the aspect ratio may be, for example, at least or greater than 2,000, 5,000, or 10,000. In some embodiments, the carbon fiber is termed "continuous," which generally corresponds to a length of a least 1, 2, 5, or 10 meters. As well known in the art, the continuous carbon fiber is produced in a continuous processing operation in which the precursor fiber and resulting carbon fiber are held in reels (or creels), with long lengths (e.g., tens or hundreds of meters, or kilometers) of the fiber coiled (i.e., wound) within the reels. The continuous carbon fiber, after being coated and processed according to the present invention, may also be chopped. Typically, the continuous carbon fiber is chopped into pieces having a length of at least or greater than 0.1 cm (1 mm). Thus, the chopped carbon fiber typically has a length of at least 0.1 cm and less than 1 meter, such as a length of about, at least, or more than, for example, 0.1, 0.2, 0.5, 1, 2, 5, or 10 cm, or a length within a range bounded by any two of the foregoing values (e.g., 0.1-10 cm). In some embodiments, the chopped segments of carbon fiber also possess an aspect ratio of at least 1000, while in other embodiments, the chopped segments of carbon fiber are not as restricted in the aspect ratio, e.g., an aspect ratio of at least or greater than 5, 10, 20, 50, 100, 200, or 500 (or range therein). Chopped segments of the foregoing lower aspect ratio may result from fine chopping (e.g., 0.1-1 cm segments) of a continuous carbon fiber having an appreciable width (e.g., 50, 100, or 200 microns). Notably, a continuous fiber may also be defined as a fiber that extends an entire length of a fiber-matrix composite while a chopped fiber may also be defined as fibers that do not extend an entire length of a fiber-matrix composite.

An individual strand or filament of the carbon fiber generally possesses a thickness of at least or greater than 1 micron. Since the aspect ratio of the carbon fiber is typically at least 1000, the minimum thickness of 1 micron also sets a minimum length of at least 1000 microns (i.e., 1 mm, or 0.1 cm). In different embodiments, the individual filament possesses a thickness of at least or greater than 1, 2, 5, 10, 20, 30, 40, 50, or 100 microns. A tow of carbon fiber includes a multiplicity (typically, several thousand) of individual carbon filaments and typically has a thickness of at least 10, 50, or 100 microns and up to, for example, 100, 500, or 1000 microns. The term "carbon fiber." as used herein, is intended to include tows or bundles of carbon fiber. In some embodiments, the carbon fiber is a single carbon fiber (i.e., not part of a tow). Notably, the macroscopic length and width dimensions provided above for the carbon fiber do not correspond with the lengths or widths typical of nanoscopic carbon fibers or carbon particles, such as carbon nanotubes. In some embodiments, the term "carbon fiber" excludes the known nanoscopic carbon fibers and particles, such as carbon nanotubes and the like. In some embodiments, the carbon fiber bonded to the amine-containing polymer was not pre-treated by any of the known surface treatments (e.g., oxidation, plasma, gamma, or rare earth surface treatment) known to introduce reactive functional groups or other features on the surface of the carbon fiber.

An amine-containing polymer coating (i.e., sizing agent) is bonded to the outer surface of the carbon fiber. The coating of the amine-containing polymer typically has a thickness of no more than or less than 5 microns (5000 nm). In different embodiments, the sizing agent has a thickness of no more than or less than 5000, 2000, 1000, 500, 250, 200, 150, 100, 75, 50, 40, 30, 20, 10, or 5 nm, or a thickness within a range bounded by any two of the foregoing values (e.g., 5-5000 nm, 5-2000 nm, 5-1000 nm, 5-500 nm, 5-250 nm, 5-100 nm. 5-50 nm. 10-5000 nm, 10-2000 nm, 10-1000 nm, 10-500 nm, 10-250 nm, 10-100 nm, 10-50 nm, 20-5000 nm, 20-2000 nm, 10-1000 nm, 10-500 nm, 10-250 nm, 10-100 nm, 10-50 nm. 50-5000 nm, 50-2000 nm, 50-1000 nm, 50-500 nm, 50-250 nm, or 50-100 nm). The term "bonded," as used herein, includes any type of interaction that results in a strong non-reversible attachment of the amine-containing polymer coating with the carbon fiber. The bonding may be or include, for example, covalent bonding, hydrogen bonding, ionic bonding, or van der Waals bonding, or a combination of any two or more of these.

The amine-containing polymer contains at least one of primary and secondary amino groups, e.g., only primary amino groups, only secondary amino groups, or both primary and secondary amino groups. Some examples of amine-containing polymers include chitosan, polyethyleneimine, polylysine, polyglycine, poly(allylamine), poly(diallylamine), poly(4-aminostyrene), poly(vinylamine), and poly(N-methylvinylamine). Notably, particularly at more acidic pHs (i.e., up to or less than 6 or 7), the amine groups in the amine-containing polymer become protonated, in which case the polymer can be regarded as a cationic polymer. Moreover, the polymer may be reacted with electrophilic species (e.g., methyl halides) to produce a permanently cationic polymer, such as poly(diallyldimethylammonium chloride). For purposes of the present invention, any cationic version of any of the exemplary amine-containing polymers provided above are considered within the scope of the term "amine-containing polymer." An example of an amine-containing polymer presented here is chitosan, which is a N-deacetylated derivative of chitin (FIG. 1) and is isolated from crustacean animals and plants-specifically, from the exoskeletons of shellfish, insects, and the cell walls of mushrooms.

In another aspect, the present disclosure is directed to an electrodeposition method for producing the surface-modified carbon fiber described above. In the method, an uncoated carbon fiber, which may be any of the types and examples of carbon fibers described above, is immersed in a solution containing a dissolved amount of an amine-containing polymer (e.g., chitosan, polyethyleneimine, or any of the others described above) while the uncoated carbon fiber is connected to a negatively charged electrode (i.e., negative electrode, or cathode) and positioned adjacent to a positively charged electrode (i.e., anode) in the solution. The solution may be, for example, e.g., an aqueous or organic solvent-based solution. As the polymer in solution is positively charged, the polymer will be attracted to and deposit onto the negatively charged carbon fiber. At least in view of the solution containing the positively-charged polymer, the solution is also herein considered an "electrolyte solution". Notably, electrolytes other than the positively-charged polymer may or may not also be included in the electrolyte solution. The application of a voltage across the electrodes results in the electrodeposition of a coating of the amine-containing polymer on the uncoated carbon fiber. The voltage may be direct or alternating to result in a DC or AC process, respectively. The uncoated carbon fiber may or may not have been pre-treated by any of the known surface treatments (e.g., oxidation, plasma, gamma, or rare earth surface treatment) known to introduce reactive functional groups or other features on the surface of the carbon fiber before being treated by the electrodeposition method. In some embodiments, the carbon fiber is a continuous carbon fiber and the fiber undergoes the electrodeposition method in a continuous feed-through process.

The solution used in the electrodeposition process is often aqueous-based, i.e., includes water as a solvent, either alone or in admixture with a water-miscible solvent. The aqueous solution preferably has a pH below 7 (e.g., a pH of 2, 2.5, 3, 3.5, 4, 4.5, 5, 5.5, 6, or 6.5, or within a range therein, e.g., 2-6, 3-6, 2-5, or 3-5) to ensure that the amine-containing polymer is positively charged by protonation. An acid (e.g., HCl or acetic acid) may be added to the aqueous solution to maintain an adequately low pH. A base may also be added to further adjust the pH. As the amine-containing polymer is positively charged during the electrodeposition process, the aqueous solution can be considered an electrolyte solution. The aqueous solution may or may not also contain an additional electrolyte, such as a salt, e.g., ammonium sulfate. At least a portion (or all) of the amine-containing polymer is dissolved in the aqueous solution. In some embodiments, a portion of the amine-containing polymer is suspended in the aqueous solution while a portion is dissolved. In some embodiments, the solution contains a non-aqueous polar solvent in a predominant or total amount (i.e., water may or may not be present). The non-aqueous polar solvent may be, e.g., an alcohol (e.g., methanol, ethanol, or isopropanol), a ketone (e.g., acetone), tetrahydrofuran (THF), N-methylpyrrolidinone (NMP), acetonitrile, dimethylformamide (DMF), or dimethylsulfoxide (DMSO), or a combination of any of these.

The amine-containing polymer is typically included in the solution in a concentration of at least or above 0.001 wt % and a concentration of up to or less than 5 wt %. In different embodiments, the amine-containing polymer is included in the solution in a concentration of precisely, about, or at least, for example, 0.001, 0.01, 0.1, 0.2, 0.3, 0.4, 0.5, 0.6, 0.7, 0.8, 0.9, 1, 1.2, 1.5, 1.8, 2, 2.5, 2.8, 3, 3.2, 3.5, 3.8, 4, 4.2, 4.5, 4.8, or 5 wt %, or a concentration within a range bounded by any two of the foregoing values, e.g., 0.001-5 wt %, 0.01-5 wt %, 0.1-5 wt %. 0.2-5 wt %, 0.5-5 wt %, 0.001-4 wt %, 0.01-4 wt %, 0.1-4 wt %. 0.2-4 wt %, 0.5-4 wt %, 0.001-3 wt %, 0.01-3 wt %. 0.1-3 wt %. 0.2-3 wt %, 0.5-3 wt %, 0.001-2 wt %, 0.01-2 wt %, 0.1-2 wt %. 0.2-2 wt %, 0.5-2 wt %, 0.001-1.5 wt %, 0.01-1.5 wt %, 0.1-1.5 wt %. 0.2-1.5 wt %, 0.5-1.5 wt %, 0.001-1 wt %. 0.01-1 wt %. 0.1-1 wt %, 0.2-1 wt %, 0.001-0.5 wt %, 0.01-0.5 wt %, 0.1-0.5 wt %. 0.2-0.5 wt %. 0.001-0.2 wt %, 0.01-0.2 wt %, 0.001-0.1 wt %, or 0.01-0.1 wt %. Any of the concentrations or ranges thereof, as provided above, can be combined with any of the pH values or ranges thereof, provided earlier above.

The thickness of the coating of the amine-containing polymer can be at least partly controlled by selection of the polymer concentration during the electrodeposition process. A thickness of no more than or less than 5000, 2000, 1000, 500, 250, 200, 150, 100, 75, 50, 40, 30, 20, 10, or 5 nm, or a thickness within a range bounded by any two of the foregoing values (as provided earlier above) can be at achieved at least in part by appropriate selection of the amine-containing polymer concentration in the aqueous solution, wherein a higher concentration generally results in a thicker coating. Any of the concentrations or ranges thereof, provided above, may be used for achieving a particular thickness or range thereof, as provided above. Moreover, any of the concentrations or ranges thereof, as provided above, can be combined with any of the pH values or ranges thereof, provided earlier above, to achieve any of the thicknesses or ranges thereof, provide above.

The thickness of the coating of the amine-containing polymer can also be at least partly controlled by selection of the period of time that the voltage is applied during the electrodeposition process. Any of the possible thicknesses or ranges thereof, as provided above, may be achieved by judicious selection of the polymer concentration and period of time. The period of time of the electrodeposition process (i.e., during which voltage is applied) is typically at least 5 seconds (5 s). In different embodiments, the period of time of the electrodeposition process is precisely, about, or at least, for example, 5, 10, 15, 20, 30, 45, 60, 90, or 120 s, or a period of time within a range bounded by any two of the foregoing values, e.g., 5-120 s, 5-90 s, 5-60 s, 5-30 s, 10-120 s, 10-90 s, 10-60 s, 10-30 s, 20-120 s, 20-90 s. 20-60 s. 20-30 s, 30-120 s, 30-90 s, 30-60 s, 45-120 s, 45-90 s, or 45-60 s. Any of the concentrations or ranges thereof, as provided above, along with any of the times or ranges thereof, as provided above, may be used for achieving a particular thickness or range thereof, as provided above. Moreover, any of the concentrations or ranges thereof, as provided above, can be combined with any of the electrodeposition times or ranges thereof, as provided above, and these can be further combined with any of the pH values or ranges thereof, provided earlier above, to achieve any of the thicknesses or ranges thereof, provide above.

The thickness of the coating of the amine-containing polymer can also be at least partly controlled by selection of the electrical current (or electrical current density) applied during the electrodeposition process. Any of the possible thicknesses or ranges thereof, as provided above, may be achieved by judicious selection of the polymer concentration, electrodeposition time, and current (or current density). The current may be, for example, 0.01, 0.02, 0.05, 0.1, 0.2, 0.3, 0.4, 0.5, 0.6, 0.7, 0.8, 0.9, or 1 A, or within a range bounded by any two of the foregoing values (e.g., 0.05-0.5 A, 0.05-1 A, 0.1-0.5 A, or 0.1-1 A) for a typical CF tow. The current density is typically at least 0.5 $A/m^2$. In different embodiments, the current density is precisely, about, or at least, for example, 0.5, 1.0, 1.5, 2, 2.5, 3, 4, 5, 6, 7, 8, 9, 10, 15, 20, 25, or 30 $A/m^2$, or a current density within a range bounded by any two of the foregoing values, e.g., 0.5-30 $A/m^2$, 0.5-25 $A/m^2$, 0.5-20 $A/m^2$, 0.5-15 $A/m^2$, 0.5-10 $A/m^2$. 0.5-6 $A/m^2$, 0.5-2 $A/m^2$, 1-30 $A/m^2$, 1-25 $A/m^2$, 1-20 $A/m^2$, 1-15 $A/m^2$, 1-10 $A/m^2$. 1-6 $A/m^2$. 1-2 $A/m^2$. 1.5-30 $A/m^2$. 1.5-25 $A/m^2$, 1.5-20 $A/m^2$. 1.5-15 $A/m^2$, 1.5-10 $A/m^2$. 1.5-6 $A/m^2$. 1.5-2 $A/m^2$. 2-30 $A/m^2$, 2-25 $A/m^2$. 2-20 $A/m^2$, 2-15 $A/m^2$, 2-10 $A/m^2$. 2-6 $A/m^2$. 5-30 $A/m^2$. 5-25 $A/m^2$, 5-20 $A/m^2$, 5-15 $A/m^2$, or 5-10 $A/m^2$. Any of the concentrations or ranges thereof, as provided above, along with any of the electrodeposition times or ranges thereof, as provided above, along with any of the currents or ranges thereof, as provided above, may be used for achieving a particular thickness or range thereof, as provided above. Moreover, any of the concentrations or ranges thereof, as provided above, can be combined with any of the electrodeposition times or ranges thereof, as provided above, and these can be further combined with any of the currents or ranges thereof, as provided above, and these can be further combined with any of the pH values or ranges thereof, provided earlier above, to achieve any of the thicknesses or ranges thereof, provide above.

The coating of the amine-containing polymer is preferably highly uniform in thickness. The uniformity in thickness may be, for example, no more than ±1 micron, ±0.5 microns, ±0.2 microns, ±0.1 microns, ±0.05 microns, ±0.02 microns, or ±0.01 microns, from a thickness value, such as any of the exemplary thickness values provided earlier above. As an example, the coating may have a thickness of 0.2±0.1 microns, which corresponds to a thickness range of 0.1-0.3 microns, or the coating may have a thickness of 0.2±0.05 microns, which corresponds to a thickness range of 0.15-0.25 microns, or the coating may have a thickness of 0.2±0.02 microns, which corresponds to a thickness range of 0.18-0.22 microns, or the coating may have a thickness of 0.2±0.01 microns, which corresponds to a thickness range of 0.19-0.21 microns. Any of the exemplary thicknesses, provided earlier above, may be combined with any of the exemplary uniformity in thickness values, provided above. Moreover, several factors, including pH, polymer concentration, electrodeposition time, and current used during electrodeposition, all as described earlier above, can contribute to achieve a specific coating thickness or range thereof, as provided earlier above, and a specific uniformity in thickness, as provided above. Any of the values or ranges of pH, polymer concentration, electrodeposition time, and current or current density used during electrodeposition, as provided earlier above, can be selected and combined to achieve a specific coating thickness or range thereof, as provided earlier above, as well as a specific uniformity in thickness, as provided above.

In some embodiments, after electrodeposition of the amine-containing polymer onto the carbon fiber, the surface-modified (coated) carbon fiber is washed to remove excess amine-containing polymer from the carbon fiber. The coated carbon fiber is typically washed with an aqueous solution (e.g., water or water-solvent mixture), which may correspond to the aqueous solution used during electrodeposition except that the amine-containing polymer and possible other electrolyte or salt may be omitted.

After the amine-containing polymer is coated onto the carbon fiber, as described above, the coating on the carbon fiber is typically dried, i.e., solvent is substantially or completely removed. In one embodiment, the coated carbon fiber is subjected to gas (typically air) drying at room temperature (e.g., from 15-25° C., or about 20° C.). The gas drying may be practiced under static gas or flowing gas conditions. If a gas other than air is used, the gas may be, for example, an inert gas, such as nitrogen or argon. In other embodiments, an elevated temperature may be used to facilitate removal of the solvent.

Where an elevated temperature is used, the coated carbon fiber is heated to sufficient temperature to evaporate the solvent. By virtue of the drying process, the sizing agent becomes more strongly bonded to the surface of the carbon fiber. The sizing agent becomes bonded to the carbon fiber by any of the known bonding mechanisms, e.g., covalent, hydrogen, ionic, and/or physisorption bonding. The carbon fiber is subjected to a temperature below the decomposition temperature of the sizing agent. In different embodiments, depending on the solvent and sizing agent, the drying temperature may be, for example, precisely or about 150, 140, 130, 120, 110, 100, 90, 80, 70, 60, or 50° C., or a temperature within a range bounded by any two of the foregoing values. To further facilitate solvent removal, a vacuum may be applied to the coated carbon fiber.

Following the above drying step, the coated carbon fiber may, in some embodiments, be subjected to a subsequent (e.g., a continuous feed-through) process. For example, the sizing agent on the coated carbon fiber may be reacted with a crosslinking (curing) agent, such as described above, by dip coating, spraying, or brushing the coated carbon fiber with a solution or emulsion containing a crosslinking agent. The carbon fiber is typically again dried after the crosslinking step. In other embodiments, a second coating of the same or different amine-containing polymer sizing agent is applied onto the carbon fiber.

In some embodiments, before the carbon fiber has been coated with the amine-containing polymer sizing agent, the carbon fiber is subjected to a process, such as any of those described earlier above, that functionalizes the carbon fiber surface with reactive groups that can form covalent, hydrogen, or ionic bonds with the sizing agent. For example, the carbon fibers may be subjected to a process in which hydroxyl (OH), carboxyl (COOH), and/or amino (e.g., $NH_2$) groups functionalize the surface of the carbon fiber. Carbon fibers can be surface-functionalized with such reactive groups by methods well known in the art, such as by an oxidative (e.g., plasma or chemical) surface treatment. Moreover, such surface-functionalized carbon fibers may be commercially available. In other embodiments, the carbon fiber is not subjected to a surface functionalization process before being coated with the amine-containing polymer. In some embodiments, the carbon fiber may be subjected to a surface cleansing process which may or may not introduce surface functional groups.

In another aspect, the present disclosure is directed to a carbon fiber composite material containing surface-modified (polymer-coated) carbon fibers, as described above, homogeneously incorporated (embedded) into a polymer matrix. The coating of the amine-containing polymer can have any of the compositions, thicknesses, and uniformities described earlier above and may have been deposited by electrodeposition under any of the conditions (e.g., polymer concentrations, electrodeposition times, currents, current densities, and pHs) described earlier above. The polymer may be any of the polymers known in the art, including thermoplastics or curable resins, that can form a solid object containing the surface-modified carbon fibers homogeneously incorporated therein. The end (solid) polymer matrix in which the carbon fibers are incorporated (i.e., after mixing or compounding, followed by curing or hardening) may be a thermoplastic or thermoset. As further discussed below, in some embodiments, the polymer may be produced by reaction between a resin or pre-polymer and a curing (e.g., crosslinking) agent. In some embodiments, the polymer matrix has sufficient strength or toughness to be useful in a rugged application.

In some embodiments, the polymer matrix is an epoxy-based polymer, which is typically derived from an epoxy-based resin that has been cured with an epoxy-reactive curing agent (e.g., polyamines, polyphenols, or polyacids). The curing agent may include the amine-containing polymer coated on the carbon fibers (e.g., chitosan or polyethyleneimine, or any of the others provided earlier above). Typically, the epoxy-based resin possesses at least two epoxide groups, and thus, can be a difunctional, trifunctional, tetrafunctional, or a higher functional epoxy resin. In some embodiments, the epoxide group is present as a glycidyl group. The epoxy resin can be conveniently expressed by the following generic structure:

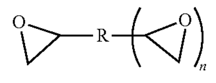

(1)

In Formula (1), n may be precisely or at least 1, 2, 3, 4, 5, 6, or any suitable number, including a higher number (e.g., 10, 20, 30, 40, or 50) typical for a resin having epoxide-containing units. The group R is a saturated or unsaturated hydrocarbon linking group having at least one and up to any suitable number of carbon atoms. In different embodiments, R can have precisely or at least, for example, 1, 2, 3, 4, 5, 6, 7, 8, 9, 10, 12, 15, 18, 20, 25, 30, 35, 40, or 50 carbon atoms, or a number of carbon atoms within a range bounded by any two of these values. The saturated hydrocarbon group suitable as R may be or include, for example, a straight-chained or branched alkylene group or cycloalkylene group. Some examples of saturated R linkers include methylene (i.e., $—CH_2—$), ethylene (i.e., $—CH_2CH_2—$), n-propylene (i.e., $—CH_2CH_2CH_2—$, or "trimethylene"), isopropylene ($—CH(CH_3)CH_2—$), tetramethylene, pentamethylene, hexamethylene, $—C(CH_3)_2CH_2—$, $—CH(CH_3)CH(CH_3)—$. $—CH_2C(CH_3)_2CH_2—$, cyclopropylene (i.e., cyclopropyldiyl), 1,3-cyclobutylene, 1,2-cyclopentylene, 1,3-cyclopentylene, 1,2-cyclohexylene, 1,3-cyclohexylene, and 1,4-cyclohexylene. Some examples of unsaturated R linkers include straight-chained or branched alkenylene or alkynylene groups or cycloalkenylene groups, such as vinylene ($—CH{=}CH—$), allylene ($—CH_2—CH{=}CH—$), $—CH_2—CH_2—CH{=}CH—$, $—CH_2—CH{=}CH—CH_2—$, $—CH{=}CH—CH{=}CH—$, ethynyl, ethynyl-containing hydrocarbon groups, 1,3-cyclopentenediyl, 1,4-cyclohexenediyl, as well as aromatic linking groups, such as 1,2-, 1,3-phenylene, 1,4-phenylene, 4,4'-biphenylene, naphthalen-1,5-diyl, and bisphenol A ether groups. The foregoing exemplary linking groups for R are suitable for linking two epoxide groups. However, a generic set of trifunctional, tetrafunctional, and higher functional epoxy resins are also considered herein wherein one, two, or a higher number of hydrogen atoms from any of the exemplified linking groups provided above for R are replaced by one, two, or a higher number of epoxide groups, respectively (e.g., 1,3,5-triglycidylbenzene). Any two, three, or more linking groups identified above can be linked together as well, such as two methylene groups on a phenylene group, i.e., $—CH_2—C_6H_4—CH_2—$.

In some embodiments of Formula (1), the R linking group contains only carbon and hydrogen atoms. In other embodiments, the R linking groups also includes one, two, three, or more heteroatoms or heteroatom groups. The heteroatoms are typically one or more selected from oxygen (O), nitrogen (N), sulfur (S), or a halogen, such as, for example, fluorine, chlorine, bromine, and iodine atoms. Heteroatoms can be included as, for example, ether (—O—), amino (—NH—, —N═, or as a tertiary amine group), or thioether. Some heteroatom groups include hydroxy (OH), carbonyl (—C(═O)—), organoester (—C(═O)O—), amide (—C(═O)NH—), urea, carbamate, and the like. The heteroatom or heteroatom-containing group can either insert between two carbon atoms engaged in a bond, or between carbon and hydrogen atoms engaged in a bond, or replace a carbon or hydrogen atom. A particular example of a linking group R containing two oxygen atoms is bisphenol A, which is typically di-etherified with glycidyl groups.

In particular embodiments, the epoxy resin is a glycidyl derivative, which can be conveniently expressed as a sub-generic formula of Formula (1) above by the following structural formula:

(1a)

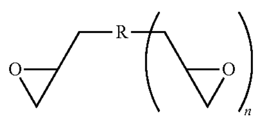

The glycidyl derivative can be any of those compounds containing glycidyl groups, typically produced by reacting epichlorohydrin with a polyhydric molecule, such as a dihydric, trihydric, or tetrahydric molecule. The polyhydric molecule can be, for example, a polyhydric alcohol, i.e., polyol (e.g., diol, triol, or tetrol, or generically defined as R—$(OH)_n$ where n is as above except that it is a minimum of 2), polyamine (e.g., diamine, triamine, or tetramine), or polycarboxylic acid (e.g., malonic, succinic, glutaric, adipic, or terephthalic acids). The linking group may also be a hydroxy-containing polymeric structure resulting from ring-opening polymerization of epoxy groups.

Some particular examples of difunctional epoxy resins include diglycidyl ethers of a diol (i.e., glycol), wherein some examples of diols include ethylene glycol, diethylene glycol, triethylene glycol, propylene glycol, 1,3-propanediol, 1,4-butanediol, 1,5-pentanediol, 1,6-hexanediol, tetraethylene glycol, pentaethylene glycol, bisphenol A, bisphenol AF, bisphenol S, neopentyl glycol, 2,2,4,4-tetramethyl-1,3-cyclobutanediol, catechol, resorcinol, dihydroxyquinone, thiodiglycol, and 4,4'-dihydroxybiphenyl. In some embodiments, the epoxy resin is an epoxy prepolymer resin of the following general formula, wherein m can be 0, 1, 2, 3, 4, 5, 10, or a number up to, for example, 20, 25, 30, 40, or 50 or a number within a range bounded by any two of these values:

(2)

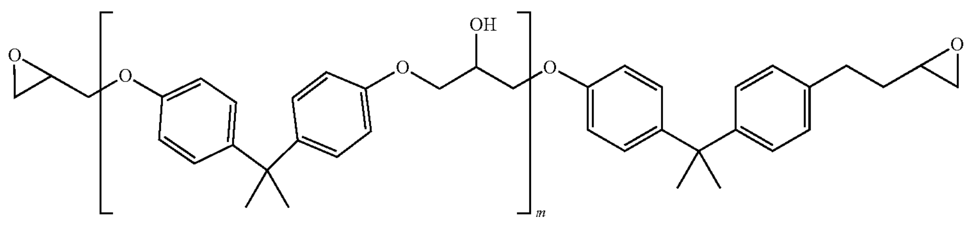

Some particular examples of trifunctional and tetrafunctional epoxy resins include triglycidyl and tetraglycidyl ethers of a triol or tetrol, respectively, wherein some examples of triols include glycerol, 1,3,5-trihydroxybenzene (phloroglucinol), trimethylolethane, trimethylolpropane, triethanolamine, and 1,3,5-triazine-2,4,6-triol (cyanuric acid). An example of a tetrol is pentaerythritol. Any such epoxy resin may be used as (or to form) the polymer matrix.

The difunctional, trifunctional, tetrafunctional, or higher functional epoxy resin can also be, for example, a diglycidyl, triglycidyl, tetraglycidyl, or higher polyglycidyl ether of a phenol novolak resin or bisphenol A novolak resin. Such resins are well known in the art, as described, for example, in U.S. Pat. No. 6,013,730, which is herein incorporated by reference in its entirety. Any such epoxy resin may be used as (or to form) the polymer matrix.

In other embodiments, the polymer matrix results from vinyl-addition polymerization of an unsaturated precursor resin or unsaturated monomers. By being unsaturated, the precursor resin or monomer contains carbon-carbon double bonds. The polymeric matrix can be derived from, for example, curing any of the acrylate or methacrylate monomers known in the art (e.g., acrylic acid, methacrylic acid, methylmethacrylate, hydroxyethylmethacrylate), acrylonitrile, ethylene, propylene, styrene, divinylbenzene, 1,3-butadiene, cyclopentene, vinyl acetate, vinyl chloride, or a cycloolefin (e.g., cyclohexene, cycloheptene, cyclooctene, or norbornene), or a fluorinated unsaturated monomer, such as vinylidene fluoride, fluoroethylene, or tetrafluoroethylene, or a bromated unsaturated monomer (e.g., DGEBA-based vinyl ester monomer with bromo substitution on the aromatic ring). The polymeric matrix can be a homopolymer, or alternatively, a copolymer, e.g., block, random, alternating, or graft copolymer of two or more different types of monomers, such as any of those mentioned above.

In some embodiments, the polymer matrix is a vinyl ester polymer derived from a vinyl ester resin by curing methods well-known in the art. Vinyl ester resins are known to possess terminal carbon-carbon double bonds. As known in the art, a vinyl ester resin is generally formed by reaction between a diepoxide, triepoxide, or higher polyepoxide (e.g., as described above under Formulas 1, la, and 2) and an unsaturated monocarboxylic acid, such as acrylic or methacrylic acid. The general process for producing an exemplary difunctional divinyl ester is provided as follows:

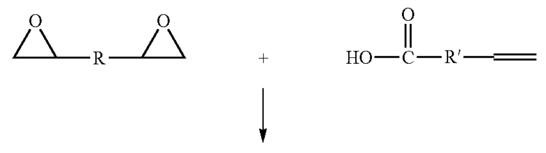

-continued

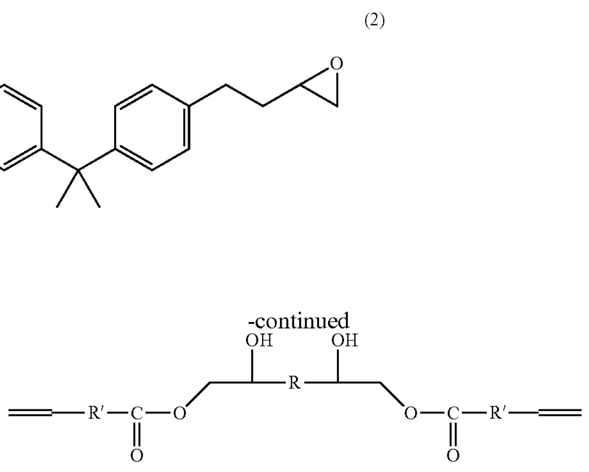

In the above scheme, an exemplary set of difunctional divinyl ester products are depicted in which R is as defined above and R' is either a bond or a hydrocarbon linker R, as defined above. In particular embodiments, the diepoxy molecule depicted in the above scheme is diglycidyl ether of bisphenol A (DGEBA).

The polymer matrix may alternatively be derived from an unsaturated polyester resin. Unsaturated polyester resins are known to possess internal carbon-carbon double bonds. As known in the art, an unsaturated polyester resin is generally formed by reaction between a diol, triol, tetrol, or higher polyol, such as any of the polyols described above, and an unsaturated di- or tri-carboxylic acid, such as maleic, phthalic, isophthalic, or terephthalic acid or their anhydride products. The general process for producing an exemplary unsaturated polyester resin is provided as follows:

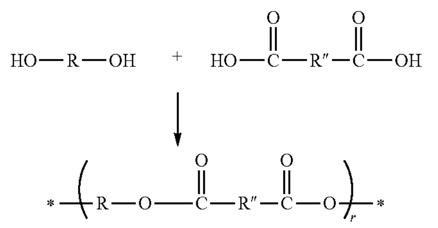

In the above scheme, an exemplary set of unsaturated polyester resin products are depicted in which R is as defined above and R" is an unsaturated hydrocarbon linker containing a reactive alkenyl group, such as any of the unsaturated hydrocarbon linkers defined for R above containing this feature, and r is generally at least 1, 2, 3, 4, or 5, and up to 6, 7, 8, 9, 10, 12, 15, 18, or 20 (or any range bounded by any two of these values). The diol HO—R—OH shown in the above scheme may be replaced with or combined with a triol, tetrol, or higher functional alcohol, or generically defined as R—(OH), where n is as above except that it is a minimum of 2, and the dicarboxy molecule depicted in the above scheme can be replaced with or combined with a tricarboxy or higher carboxy molecule. In particular embodiments, the polyol is selected from a polyethylene glycol, such as ethylene glycol, diethylene glycol, and triethylene glycol, and the polycarboxy is selected from maleic acid, phthalic acid, isophthalic acid, and terephthalic acid. In some embodiments, polycarboxy products are acid anhydrides or esters that can react with polyol via esterification or transesterification reaction.

The polymer matrix can also be any of the condensation polymers known in the art.

The condensation polymer can be, for example, a polyester (e.g., PET, PETG, PLA, PGA, PHA, PBS, or copolymer or mixture thereof), polyamide (nylon), polyurethane, rubber (e.g., acrylonitrile-containing copolymer, such as ABS, or isoprene-containing rubber), polysiloxane, polyolefin (e.g., polyethylene, polypropylene, LDPE, HDPE, PVC, PVDF, polystyrene, or copolymer thereof), or phenol-formaldehyde, or a copolymer thereof, or a copolymer with any of the addition polymers described above. As well known, PET is polyethylene terephthalate, PETG is PET with glycol, PLA is polylactic acid, PGA is polyglycolic acid, PHA is polyhydroxyalkanoate, and PBS is polybutylene succinate. As also well known, LDPE is low density polyethylene, HDPE is high density polyethylene, PVC is polyvinylchloride, PVDF is poly(vinylidene difluoride). In some embodiments, the polymer matrix is a thermoplastic selected from polyether ether ketone (PEEK), polycarbonates, polymethacrylic acids, polyesters, polylactic acids, polyglycolic acids, thermoplastic polyurethanes, polymethacrylates, polymethylmethacrylates, Nylon 6, Nylon 6,6, polysulfones, polyvinylalcohols and polyimides.

In another aspect, the present disclosure is directed to methods for producing the above-described carbon fiber composite materials. In particular methods, carbon fibers coated with the amine-containing polymer (sizing agent) are mixed with a compoundable matrix precursor resin or prepolymer before subjecting the mixture to a curing or hardening (solidifying) process. The carbon fibers may alternatively be mixed with a thermoplastic polymer in the melted state. In either case, the carbon fibers are homogeneously mixed with a polymer precursor in a liquid or semi-solid state to permit mixing or compounding. The polymer precursor may or may not require curing to become solidified.

The matrix precursor resin can be any of the precursor resins described above, e.g., an epoxy resin or an unsaturated precursor resin, such as a vinyl ester resin or unsaturated polyester resin. In some embodiments, the resin or pre-polymer is partially or fully cured with a difunctional or higher functional molecule (curing agent) capable of cross-linking reactive (e.g., epoxy, amine, or vinyl) groups in the resin or pre-polymer to produce the final polymer matrix. In the case of an epoxy-based polymer, the curing agent contains epoxy-reactive groups, such as, for example, hydroxy (e.g., alcohol or phenol), carboxylic acid, thiol, amine, or amide groups. Typically, the curing agent is a polyamine, such as a diamine, triamine, tetramine, or higher polyamine, such as an amine-containing polymer, wherein it is understood that the polyamine contains at least two amino groups selected from primary and secondary amines. The polyamine curing agent can be conveniently expressed as R—$(NH_2)_n$, wherein R and n are as defined above in Formula (1). In some cases, one or two hydrogen atoms of the amino group may be replaced with a linker R or a hydrocarbon group (a protonated form of any of the linking groups R), which may itself also contain a primary, secondary, or tertiary amine group. Some examples of polyamine curing agents include ethylene diamine (EDA), diethylenetriamine (DETA), triethylenetetramine (TETA), tetraethylenepentamine (TEPA), piperazine, guanidine, 2-cyanoguanidine (dicyandiamide), aromatic amines (e.g., diaminobenzene, methylenedianiline, and 3,3'- and 4,4'-diaminodiphenylsulfones), polyethylene glycol-based polyamines (e.g., triethylene glycol diamine or tetraethylene glycol diamine, or as provided by the commercially available polyetheramine JEFFAMINE® series of compositions), m-phenylenediamine, imidazole, 2-methylimidazole, diethylaminopropylamine, isophoronediamine, m-xylenediamine, as well as their N-alkyl (e.g., N-methyl or N-ethyl) analogs, provided that at least two amino groups selected from primary and secondary amines are provided in the curing agent.

The conditions used in curing such precursor resins are well known in the art, and may rely on, for example, an elevated temperature, radiative exposure (e.g., UV, microwave, or electron beam), or both, as well as the use of an initiator, such as a peroxide (e.g., cumene hydroperoxide, butanone peroxide, t-butylperoxybenzoate, benzoyl peroxide, or MEKP) or Lewis acid (e.g., $BF_3$), and if applicable, a catalyst, such as a metal-containing catalyst, e.g., a ROMP catalyst. In embodiments, depending on the type of polymer system, the curing step is conducted at a temperature selected from 100° C. 105° C., 110° C., 115° C., 120° C., 125° C., 130° C. 135° C., 140° C., 145° C., 150° C., 155° C., 160° C., 165° C., 170° C., 175° C., 180° C., or 185° C., or a temperature within a range bounded by any two of these values, for a curing time selected from, for example, 0.01, 0.02, 0.05, 0.1, 0.2, 0.5, 1.0, 1.5, 2.0, 2.5, 3.0, 3.5, 4.0, 4.5, 5, 6, 7, or 8 hours, or a time within a range bounded by any two of these values, wherein it is understood that higher curing temperatures generally require shorter curing times to achieve the same effect. In some embodiments, a two-step or three-step curing process is used, wherein each step employs a different temperature. Moreover, the curing step can be conducted at room temperature with the help of a promoter included in the resin, such as cobalt naphthenate, cobalt octoate, or cobalt acetylacetonate, and can be accelerated by the use of a catalyst, such as N,N-dimethylaniline and similar molecules. In the case of a thermoplastic polymer, a curing step is typically not employed. A thermoplastic polymer may be cooled over time to harden into a solid without employing a curing step.

Examples have been set forth below for the purpose of illustration and to describe certain specific embodiments of the invention. However, the scope of this invention is not to be in any way limited by the examples set forth herein.

EXAMPLES

Overview

In this work, chitosan (structure shown in FIG. 1) suspensions with different pH values (3.0, 4.5, 6.0) were used as the electrolyte at two different currents (0.05 A and 0.2 A) and three electrodeposition times (30 s, 45 s, and 60 s) to investigate the effect of chitosan deposition on the properties of treated CF-reinforced epoxy matrix. The deposited layer of chitosan is analogous to sizing applied on fiber surfaces where the sizing is usually designed to modify the wettability, protect the fibers during handling and weaving and above all to create an interphase (immobilized polymer layer on the fiber surface) in the composite by inter-diffusion, which theoretically enhances the load transfer efficiency and mechanical properties. The novel process, in effect, achieves the traditional surface treatment process and sizing application process into a single unit operation. Commercial unsized and GP (general purpose) sized CFs were used as the baselines to compare with chitosan thin film deposited CFs. The present work additionally demonstrates reversible deposition and removal of the chitosan coating through electrochemically deposition and washing process, respectively, under the weakly acidic condition.

Experimental

Materials

IM7 grade (5.2 μm filament diameter, 12 k tow) unsized and GP sized carbon fiber (CF) were used. Low molecular weight chitosan (50,000-190,000 Da, 75-85% deacetylated) was used. Acetic acid (ACS reagent) and sodium hydroxide (reagent grade) were used. The EPON resin 862 (diglycidyl ether of bisphenol F) and the Epikure™ curing agent W were used. A proprietary bio-based epoxy and curing agent was used.

Preparation and Characterization of Chitosan Gel

The calculated amount of chitosan powder was added to distilled water to prepare a 0.01 wt. % suspension. Acetic acid was added dropwise to adjust the pH to 3.0 for uniform dispersion of chitosan. The suspension was continuously stirred for 30 min then different amounts of sodium hydroxide were used to elevate the pH to 4.5 and 6.0. The chitosan suspensions (pH=3.0, 4.5, and 6.0) were used as the electrolyte for CF surface treatment.

Electro-Deposition of Chitosan onto Carbon Fiber

Figure 2:
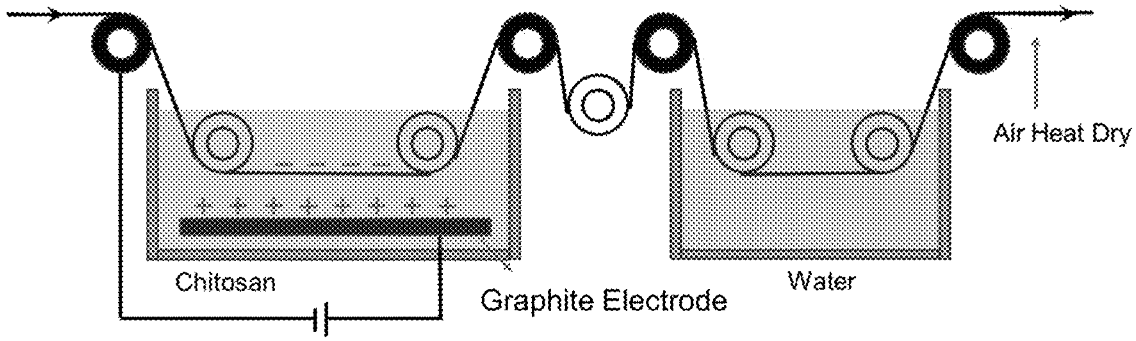
FIG. 2 is a schematic illustration for electrochemical surface modification of carbon fiber with an amine-containing polymer (e.g., chitosan).

A schematic illustration of the electrochemical deposition process used is shown in FIG. 2. Two levels of electric currents (0.05 A and 0.2 A) and three processing times (30 s, 45 s, and 60 s) were selected to conduct the CF surface modification with chitosan. In most conventional electrochemical surface treatments, CF is used as an anode to introduce oxygen-rich groups onto the carbon fiber surfaces. In contrast, in the present work, CF was used as the cathode to facilitate deposition of the positively charged chitosan particles. A follow-up washing step was applied to remove the loosely bound chitosan. The treated CF was left in the hood for two days to dry the fibers at room temperature.

Preparation of CF/EP Composite

The continuous carbon fiber composites were fabricated using a filament winding technique. The tows were wrapped on a frame and the number of tows were selected based on producing a composite with 60 vol % fibers. The EPON 862 and EPIKURE curing agent W were mixed with a stoichiometry ratio (100:26.4 by weight) and applied to each layer during the winding process. The as-prepared carbon fiber composite was inserted into a mold which was then compressed to a set volume, and heat cured at 121° C. for 4 h. The sample prepared with biobased epoxy matrix (epoxy: curative=100:42 by weight) was cured at 82° C. for 1 h. The cured materials were sectioned for the interlaminar short beam shear test based on ASTM D2344. For the chopped fiber composite, the fibers were cut into ⅛" and dispersed into the EPON 862 resin with stirring at 80° C. for 30 min. Then the stoichiometry ratio of curing agent W was added and degassed for 5 min. The composite was cured at 121° C. for 4 h, then cut into type V shape and tested based on ASTM D638.

Results and Discussion

Analysis of Surface Morphology of Chitosan Deposited CF

Figure 3:
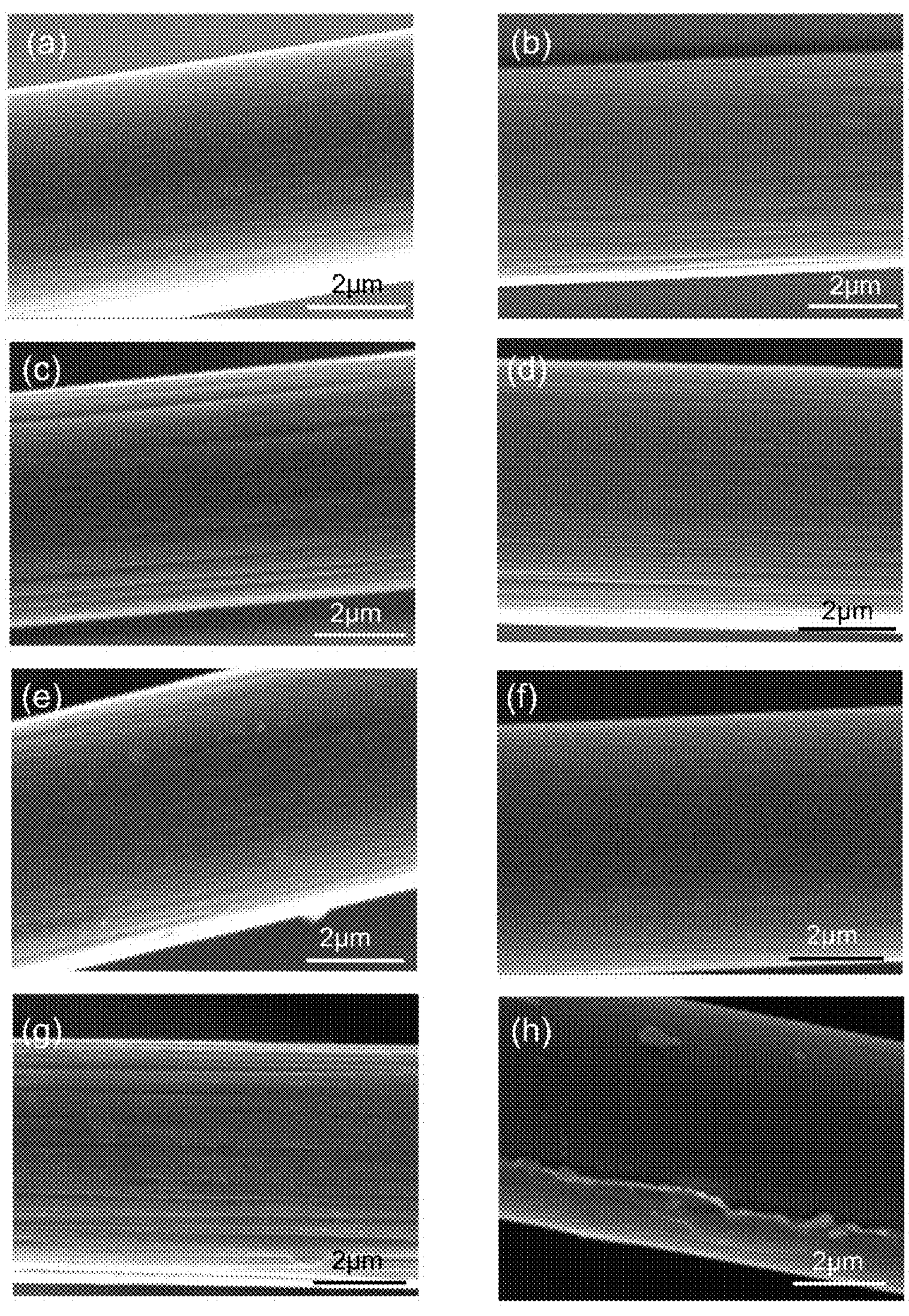
FIG. 3 (panels a-h) shows SEM images for CFs: (a) IM7 unsized; (b) IM7 sized; (c)-(h): chitosan coated CFs under different electrodeposition conditions: (c) pH 3.0, 0.05 A, 30 s; (d) pH 3.0, 0.2 A, 30 s; (e) pH 4.5, 0.05 A, 30 s; (f) pH 4.5, 0.2 A, 30 s; (g) pH 6.0, 0.05 A, 30 s; (h) pH 6.0, 0.2 A, 30 s.

The surface features of CF and chitosan deposition or coating process can play an important role in interfacial properties between CF and epoxy matrix. To understand the effect of current density and electrolyte pH on the surface morphology of the coated CFs, SEM micrographs of untreated and treated samples, as shown in FIG. 3 (panels a-h), were collected. Commercial fibers with an epoxy-based sizing layer not only have good handling and weaving potential but also show improved load transfer efficiency between reinforcing fillers and polymer matrix. However, when the general purpose sized IM7 commercial CF was used to prepare the specific CF/EP composite, the ILSS value decreased by 7.5% compared to unsized IM7, which could be attributed to lack of compatibility of the commercial sizing composition with the matrix used in these experiments, or improper coating thickness and non-uniform coating layer reflected as agglomerates on the surface of CFs (ILSS data is presented and discussed later). Compared to the commercial epoxy-based sizing, chitosan is a linear polysaccharide with glucosamine units that can form crosslinks with the epoxy matrix and carboxylic groups on the surface of CFs.

Figures 4A, 4B, 4C:
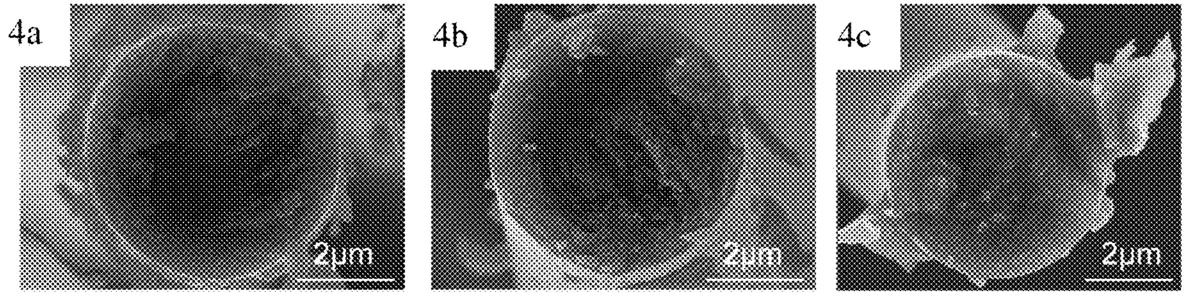
FIGS. 4*a*-4*c* show cross-section morphology for CFs: pH 3.0, 0.2 A 30 s (FIG. 4*a*); pH 4.5, 0.2 A 30 s (FIG. 4*b*); pH 6.0, 0.2 A 30 s (FIG. 4*c*) electrodeposition conditions.

Because chitosan has better dispersion in acidic suspension, three pH levels (PH~3.0, 4.5 and 6.0) were used to prepare chitosan-based electrolyte. At pH 3.0, there were no obvious agglomerates on the surface of CFs. However, this severe condition led to surface damage and a significant increase in the number of grooves after the electrochemical surface deposition process, especially at high current density. Some CFs with significantly damaged surface morphologies were produced during low pH electrochemical treatment mostly due to etching effect from the surface. When the pH rose to 4.5, small clusters of chitosan appeared but more thin coating layers clearly showed up on the surface of CFs. Meanwhile, the surface morphology of CFs remained similar to that of untreated ones. The thicker and non-uniform coating layer appeared when the pH of chitosan electrolyte reached 6.0. As the suspension became more neutral, fewer free protons were available to charge the chitosan particles that weakened the electro-repulsive force and caused the agglomerations of chitosan polymer chains. The cross-section of the coated CF is shown in FIGS. 4a-4c to investigate the thickness of CS coating. With increasing pH, the CS coating became thicker and less uniform. For the CF coated at pH 6, the large polymer aggregation can be observed at the CF surface, which deteriorates the interfacial properties. When the pH increased from 3.0 to 6.0, the percentage of protonated amine group dropped from 93.4% to 58.0% (measured by potentiometric titration). As a result, the interchain repulsive electrostatic forces got reduced, which promoted the formation of aggregated gel structure and subsequent precipitation onto fibers to form thicker and nonuniform coating.

Characterization of CF Surfaces with and without Chitosan Deposition

Elemental composition and functional groups on the surface of electrochemically coated CF were analyzed by XPS to provide evidence of successful deposition of chitosan. The calculated relative amounts of each element and functional group are summarized in Table 1. To evaluate the effect of pH on the coating process, the selected samples were all treated at 0.2 A 30 s, with pH as the only variable parameter. The unsized IM7 has residual functional groups on the surface. In CF samples with commercial sizing, the amount of oxygen content increased from 10.1% to 18.6%. CFs electrochemically treated at different pH also had an increment of oxygen which was attributed to the successful deposition of chitosan. However, the content of nitrogen slightly depleted, which could be attributed to three aspects. First, the O/C ratio is much higher than the N/C ratio in chitosan structure. With the addition of chitosan, the oxygen atomic percentage gave a more noteworthy change. Second, the amount of chitosan coating on the CF bundle decreased from the side facing the anode to the side that was away from the anode and resulted in a lower average value of chitosan functionalities than expected. Lastly, the CF used in this work was made from polyacrylonitrile precursors and it retains a portion of N on the carbon fiber surface that comes from trapped N in cyclic pyridine ring-like structures originating from cyclized nitriles. Thus, deposition of chitosan onto CF surface includes addition of other heteroatoms such as O more than the addition of N. Further, elemental N addition on CF via chitosan deposition is less than the loss of N on CF surface that gets covered by deposited chitosan. The XPS analysis presents an average information based on all the situations.

The C1s XPS spectra of different CFs were deconvoluted into four peak components with binding energies of 284.6, 285.7, 286.5, and 288.4 eV attributed to —C—C—, —C—N—, —C—O—, and —O═C—O— species, respectively. The symmetric peak at 285.1 eV corresponds to carbon with $sp^3$-hybridization including the adsorbed hydrocarbons and also two symmetric peaks in the region of higher energies. After the electrochemical deposition, the content of hydroxyl (—C—O—) was increased by 203.1%, 250.0%, and 96.9% for the CFs treated at pH 3.0, pH 4.5 and pH 6.0, respectively. The amount of carboxyl (—O═C—O—) decreased for all the chitosan coated CFs which could be attributed to either the reaction of surface acid groups with amine groups from chitosan or those acid functionalities get buried under the deposited chitosan layer, or both.

TABLE 1

Surface elemental and chemical composition of different fibers

| Sample | Surface Composition (%) | | | | Surface Functional Components (%) | | | |
|---|---|---|---|---|---|---|---|---|
| | C | O | N | Other (Si, Na, Cl) | —C—C— | —C—N— | —C—O— | —O═C—O— |
| Unsized | 83.7 | 10.1 | 5.7 | 0.5 | 72.0 | 5.2 | 3.2 | 3.4 |
| Sized | 79.6 | 18.6 | 1.2 | 0.6 | 48.5 | 1.3 | 28.6 | 1.2 |
| pH 3.0 | 81.1 | 14.0 | 4.6 | 0.3 | 65.3 | 4.2 | 9.7 | 1.9 |
| pH 4.5 | 79.2 | 14.0 | 4.7 | 2.1 | 55.2 | 4.8 | 11.2 | 2.2 |
| pH 6.0 | 79.8 | 13.3 | 4.0 | 2.9 | 64.0 | 3.7 | 6.3 | 2.6 |

(* the sample labeled with different pH were all treated at 0.2 A 30 s)

TGA revealed composition and thermal stability changes in the chitosan deposited CFs. The same samples investigated for the XPS analysis were compared here for understanding their thermal stabilities. The thermal degradation of the chitosan structure is a complex reaction involving two stages. The first stage is observed in the range of 180 to 340° C. and the second stage reaches a maximum at ~470° C. For the electrochemically treated CFs, the additional weight loss for pH 3.0, pH 4.5 and pH 6.0 was around 0.5%, 0.3%, and 1.5% at 500° C. At pH 6.0, the chitosan was poorly dispersed in the suspension and more agglomerates formed on the CF surface compared to other conditions, and this was the reason that the pH 6.0 sample also had a large weight loss. $T_{0.05}$ values (as shown Table 2), which represent the temperature for a 5.0% weight loss for CFs electrochemically treated at acidic conditions, gave a 3.0%, 2.1%, and 10.9% reduction of $T_{0.05}$ for pH 3.0, pH 4.5, and pH 6.0 sample, respectively, compared to unsized IM7 fibers. This data also demonstrated that a uniform chitosan coating with proper thickness could counter-balance the negative effects of acid etching. Comparing the thermal stability of the samples treated with or without chitosan in the acidic suspension (pH 4.5), the results showed that the chitosan coating exhibited a positive effect on the thermal stability of the CFs. The commercial sizing also improved the thermal stability of CFs, which gave a 2.5% enhancement in $T_{0.05}$.

TABLE 2

Temperature at 5 wt % loss ($T_{0.05}$) for untreated and electrochemically deposited carbon fibers (CFs) (The CFs labeled with pH were treated with 0.2 A, 30 s)

| Sample | $T_{0.05}$ (° C.) |
|---|---|
| IM7 unsized | 608.6 ± 6.8 |
| IM7 sized | 624.0 ± 8.6 |
| pH 3 | 590.8 ± 0.4 |
| pH 4.5 | 595.9 ± 2.2 |

TABLE 2-continued

| Temperature at 5 wt % loss ($T_{0.05}$) for untreated and electrochemically deposited carbon fibers (CFs) (The CFs labeled with pH were treated with 0.2 A, 30 s) | |
|---|---|
| Sample | $T_{0.05}$ (° C.) |
| pH 6 | 542.3 ± 3.5 |
| pH 4.5 No CS coating | 578.1 ± 2.5 |

Interlaminar Shear Strength of CF/EP Composites

The ILSS of a CF composite is an important parameter in evaluating the effectiveness of surface treatments. To clarify the effect of electrochemical deposition treatment, the ILSS of chitosan coated CFs at different conditions is summarized in the graphs shown in FIGS. 5*a*-5*d*. The IM7 sized and unsized were used as the baseline without any surface treatment. When the sized CF was used to prepare the composites, the ILSS dropped around 7.5% compared to the unsized one. Most likely, the incompatibility of the commercial sizing composition and the matrix used in this study and improper sizing thickness and non-uniform agglomerates of sizing on the surface of CFs contributed to the drop in ILSS. Too much deposition of sizing and its inefficient curing with matrix could form an interphase that has a strong damping effect, which lowers the load transfer efficiency.

Figures 5A, 5B, 5C, 5D:
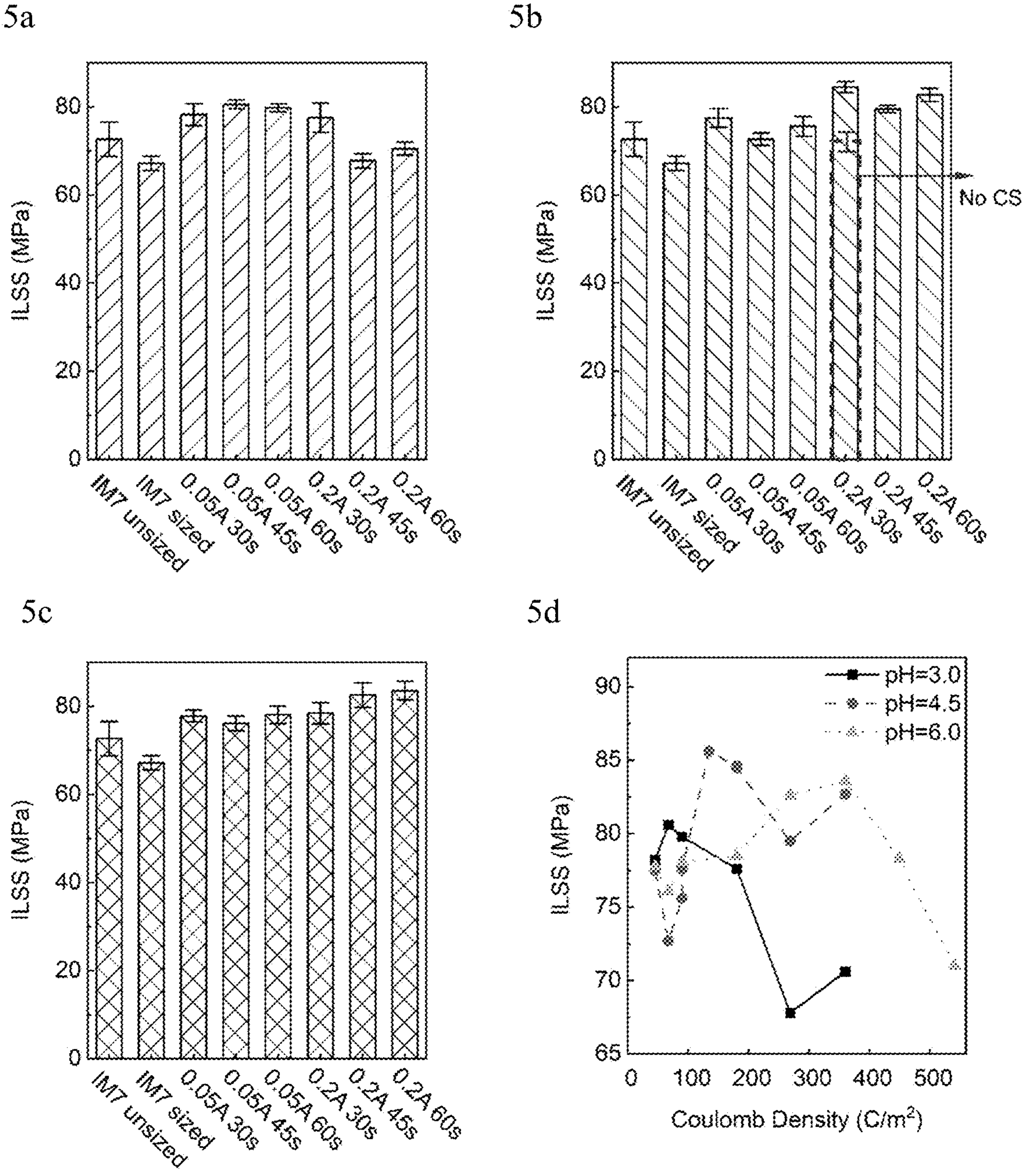
FIGS. 5*a*-5*d* summarize interlaminar shear strength (ILSS) results for chitosan deposited CF at different pH: pH 3.0 (FIG. 5*a*); pH 4.5 (FIG. 5*b*); pH 6.0 for different current and electrodeposition time (FIG. 5*c*); the relationship between ILSS and coulomb density. (CS: chitosan; the IM7 unsized and sized are used as received without any surface treatment) (FIG. 5*d*).

FIG. 5*a*-5*c* show the ILSS of chitosan deposited CFs at different pH, current and time. At pH 3.0, the best sample was the CF treated at 0.05 A for 45 s, which gave a 10.9% increase in ILSS (with 80.6 MPa as mean ILSS) and a 74.1% decrease in ILSS data variability (i.e., standard deviation) compared to unsized IM7. By increasing the current and treatment time, the ILSS dropped, and its variation became broader. Possibly, low pH induced electrochemical etching on the CF surface (removal of amorphous carbon) and irregular deposition of chitosan during "prolonged" treatment negated the reinforcing effect from the chitosan deposited layer. When the pH was elevated to 4.5, the ILSS was able to reach 84.5 MPa, which was 16.3% higher than the 72.7 MPa ILSS for unsized IM7, and the ILSS data variability (i.e., standard deviation) exhibited a 68.3% decrease. To confirm the optimal condition at this pH, the CFs were further treated at 0.1 A with various time scale. The sample electrochemically treated for chitosan deposition at 0.1 A for 45 s exhibited an ILSS of 85.8 MPa, which was 18.1% higher than that of the unsized IM7 and the uniform deposition leads to 82% decrease in ILSS data variation (i.e., standard deviation). This result is also higher than some previously published values. Other work on particle electrodeposition may be capable of enhancing the ILSS to over 90 MPa; however, the process usually requires multi-step treatments and the deposition time can be much longer (~15 min), thus making those processes less energy efficient and less scalable in a commercial processing line.

Next, the pH was increased to 6.0 and the ILSS of the samples continued to ameliorate along with higher current levels and longer treatment time. To get the best ILSS performance at this pH, 75 s and 90 s treated samples were prepared and tested. From this, it was found that 0.2 A, 60 s was preferable for the pH 6.0 suspension. The peak value for the pH 6.0 sample was lower than pH 4.5, which was due to the fact that chitosan had better dispersion at more acidic conditions. Since the surface properties of CF could be changed during the electrochemical deposition process at the acidic conditions, a new baseline sample was added as shown in FIG. 5*b* (shown as the column bar with dashed line border). The CF treated at 0.2 A, 30 s. pH 4.5 chitosan suspension gave the highest ILSS result compared to other conditions summarized in FIG. 5. These parameters were also used to treat the CF without chitosan in the electrolyte. This led to a 14.2% reduction in the ILSS if there was no chitosan existing in the suspension. The optimal condition for all the chitosan-coated CFs was 0.1 A, 45 s pH 4.5, which offered a ILSS of 85.8 MPa. However, after removing the chitosan from the suspension, the ILSS dropped by 10.0%. FIG. 5*d* summarizes the relationship between the ILSS and coulomb density utilized in the electrochemical treatment. The higher pH led to fewer free protons in the suspension, which made the chitosan less charged and dispersed. As a result, it needed longer time and higher current density to get a sufficient coating on the surface of the CF. As reflected in FIG. 5*d*. the best ILSS samples appeared at a larger coulomb density with an intermediate pH condition. The samples treated at pH 4.5, 0.1 A, and 45 s not only gave the best interfacial reinforcement but also consumed less energy compared to other samples at pH 3.0 and 6.0.

Figure 6:
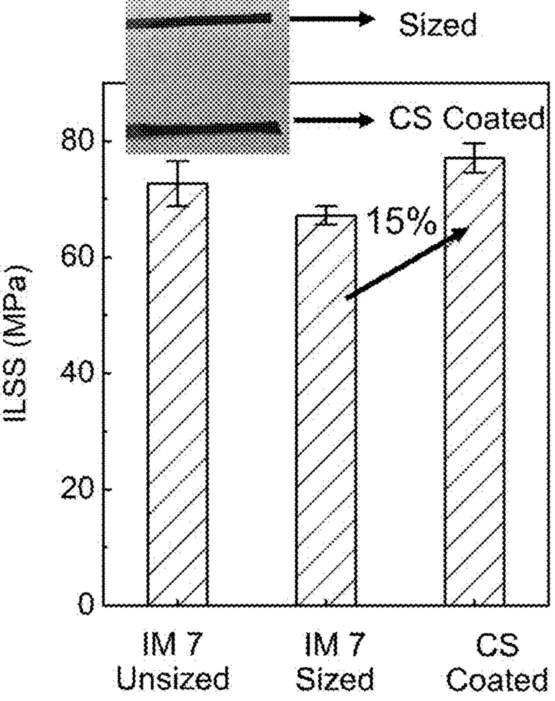
FIG. 6 shows ILSS results for different fibers (CS=chitosan). The fiber was coated via electrodeposition at pH 4.5, 0.5 A, 45 s. The coated fiber showed similar appearance as the sized fiber, as displayed in the inset image.

Besides working as the interfacial modification layer, the chitosan coating can also be used as the sizing agent. To achieve the similar performance as the commercial sized CF, higher current was adopted to attach more chitosan onto the surface of CFs at the same time period. FIG. 6 shows ILSS results for different fibers (CS: chitosan). The fiber was coated via electrodeposition at pH 4.5, 0.5 A, 45 s. As shown in the inserted digital photo of FIG. 6, the chitosan coated CF presented the similar appearance as the commercial sized CF. Furthermore, the chitosan coated CF gave a 14.7% higher ILSS result than the sized CF, which indicated that using the chitosan as the coating material, the surface treatment and sizing step for CF could be combined as one step. This combination simplifies the CF production process and makes it less costly.

Figures 7A, 7B:
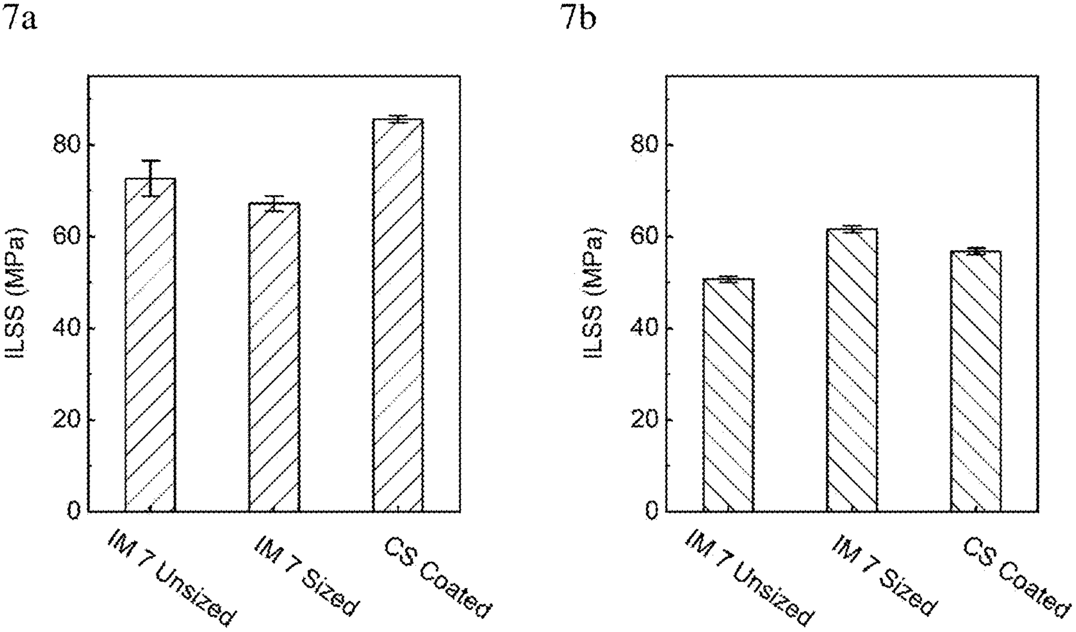
FIGS. 7*a*-7*b* compare ILSS results for fibers in two epoxy matrices.

To investigate the versatility of chitosan coating for different epoxy matrix, the biobased fast curing epoxy system was selected to prepare the composite. The chitosan coating condition was fixed as pH 4.5, 0.1 A, and 45 s, which offered the best ILSS results for EPON 862/curing agent W system. The ILSS results for the two epoxy matrices are summarized in FIGS. 7A and 7B. For the bio-epoxy system, the coated CF gave a 12.0% improvement compared to the unsized CF. The chitosan coating showed less interfacial reinforcement compared to the commercial GP sizing in this matrix, but it proved the broader feasibility for different epoxy systems, as chitosan-coated CF gave the better performance than the unsized CF for both matrices.

Mechanical Properties of CFs and CF/EP Composites

Figure 8:
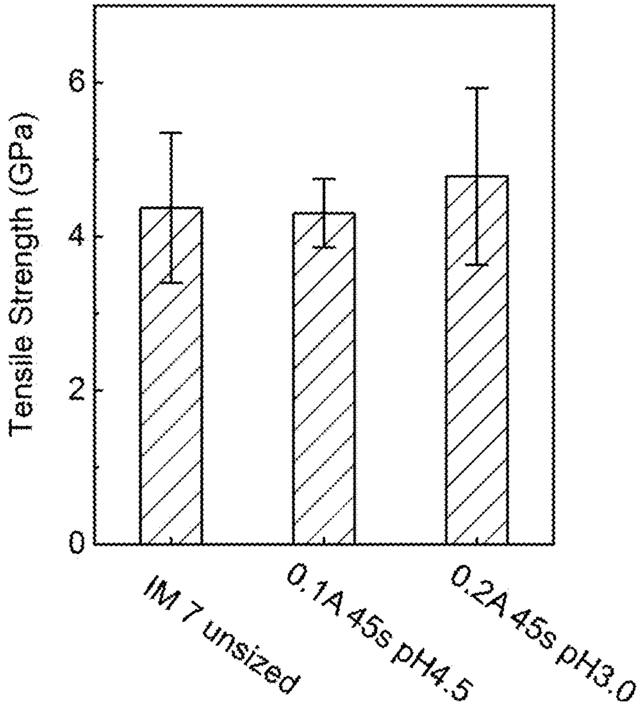
FIG. 8 is a bar chart summarizing the tensile strength of single filaments.

The single filament tensile test results are summarized in the bar graph in FIG. 8. The CFs treated under conditions of 0.1 A, 45 s. pH 4.5 and 0.2 A, 45 s. pH 3.0 were selected to analyze here as they gave the best and the worst ILSS performance. Compared to untreated IM7 CF, both chitosan-coated CFs showed similar tensile strength, which meant the electrochemical deposition process did not change the mechanical properties of CFs. The difference exhibited in the ILSS results was due to the interfacial properties.

Figure 9:
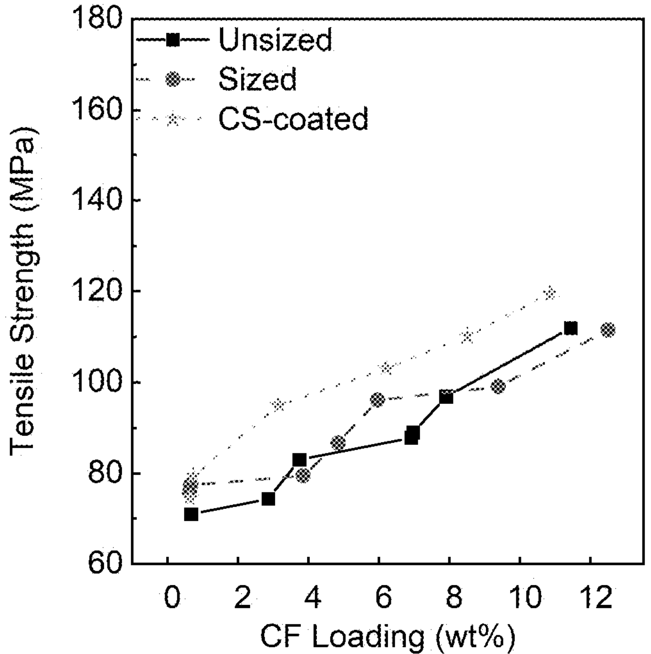
FIG. 9 is a graph showing tensile strength for chopped fiber epoxy composites. Fiber length: ⅛". The epoxy matrix is EPON 862 and curing agent W. (CS: chitosan).

Based on the ILSS results, the chitosan-deposited CF (pH 4.5, 0.1 A, 45 s), which offered the optimal interfacial properties, was selected to prepare the CF/EP composites and compared with the IM7 unsized and commercially sized one. The tensile properties of the chopped fiber and epoxy composites are summarized in the graph in FIG. 9. With increasing CF loading, all the fibers improved the tensile strength of the epoxy composites. However, the chitosan-coated CF gave the highest reinforcing effect compared to the unsized and sized CF, which can be attributed to the modified interfacial properties provided by the chitosan coating layer. These tensile results agree well with the ILSS data, which demonstrates that the chitosan-coated CF acts as an effective filler in both continuous and discontinuous forms.

Figures 10A, 10B:
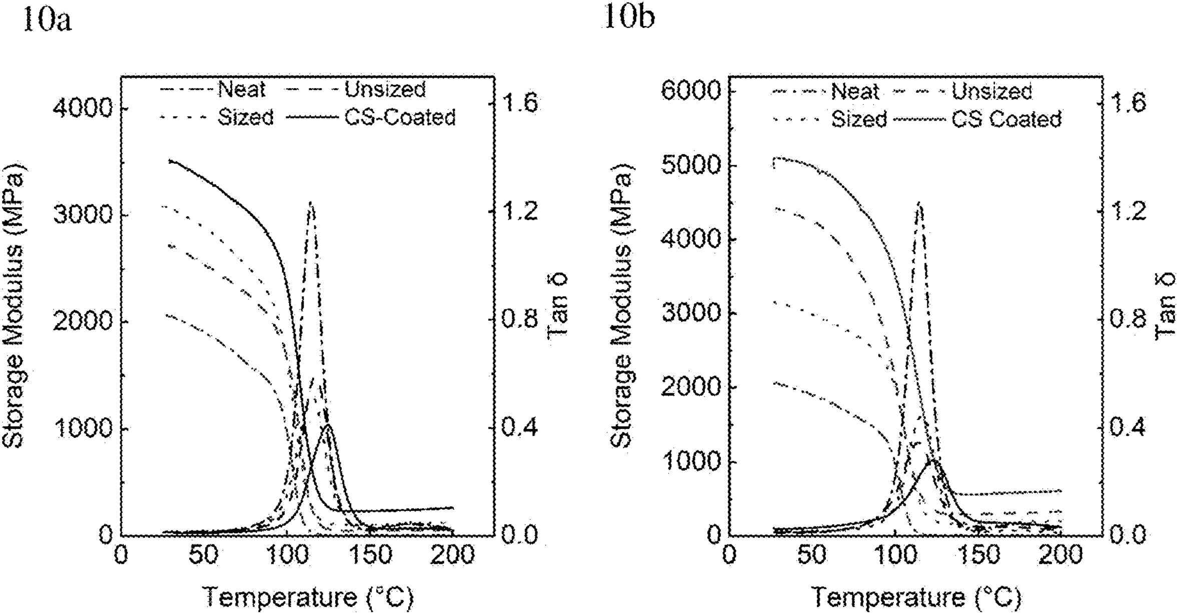
FIGS. 10*a*-10*b* plot dynamic mechanical properties of neat resin and composites based on un-sized, sized, and CS-coated CFs at 2 wt. % CF (FIG. 10*a*) and 5 wt. % CF (FIG. 10*b*).

In FIGS. 10A and 10B, dynamic mechanical analysis provided information on storage modulus and tan δ of chopped fiber and epoxy composites. The addition of fibers increased the storage modulus of the composites compared to the neat epoxy through the whole temperature range. Compared to the unsized and sized CF, the chitosan-coated CF gave the highest improvements. This was attributed to better interactions between chitosan-coated CF and matrix due to the improvement of interfacial compatibility caused by amine groups on chitosan. When the fiber loading raised up to 5 wt. % (FIG. 10*b*), the storage modulus at 25° C. of the chitosan-coated CF composites can be up to 4983 MPa compared to 4405 MPa of unsized CF. 3150 MPa of sized CF, and 2053 MPa of neat epoxy composites. The glass transition temperature (tan δ peak) of the chitosan-coated CF composite gave a value of 122.6° C., which was higher than 113.7° C. of unsized CF, 115.9° C. of sized CF, and 114.5° C. of neat epoxy composites. The higher loading of unsized and sized CF led to the negligible change in glass transition temperature of the composites. Without the proper coating, the unsized CF did not have good interfacial properties with matrix. For the sized CF, the commercial sizing lacked good compatibility with this epoxy as the sizing is usually designed for targeted polymer matrix with specific applications. Since amine groups can react with most epoxy matrices, the chitosan as the coating material can not only improve the interfacial properties but offer potential use in any of a variety of epoxy-based matrices. The chitosan-coated CF composites showed the lowest tan δ peaks at both loadings, which also indicated better interfacial interactions with polymer matrix.

Reversible Deposition

Figure 11:
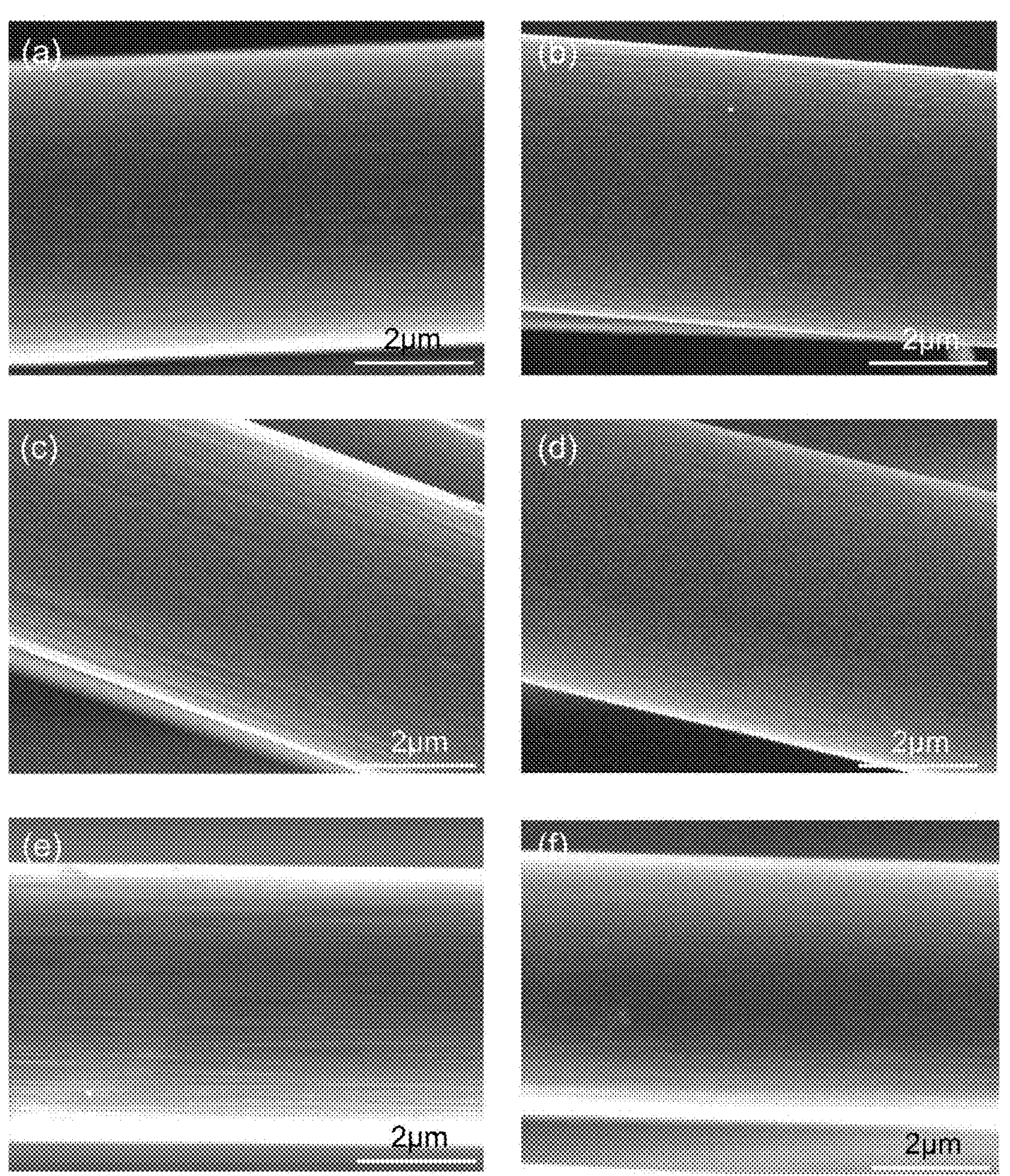
FIG. 11 (panels a-f) shows microstructure of chitosan coated CF (CS-Coated) and washed with different conditions: (a) chitosan coated CF (pH 4.5, 0.1 A, 45 s); (b) water wash (stirring in water for 24 h); (c)-(f): Acid wash: the coated CF connected to the anode with acetic acid solution (pH 4.5 and 6.0) as the electrode, the current was set at 0.1 A and the washed time were 45 s and 90 s. (c) pH 4.5 45 s; (d) pH 4.5 90 s; (e) pH 6.0 45 s; (f) pH 6.0 90 s.

To investigate the adhesion of the coating on the fiber surface and cyclic utilization of coated CFs, the CFs were either washed in water or in acidic solutions. For the water condition, the chitosan-coated CFs (the one gave the highest ILSS) was stirred in the water for 24 h; and for the acidic condition (pH 4.5 and pH 6.0), the CFs were connected to the anode and treated at 0.1 A for 45 s (same current and time as the coating process but reversing the electrode polarity) and 90 s (longer than deposition time). The morphology of the CFs is shown in the micrographs in FIG. 11 (panels a-f). The water-wash reduced the amount of chitosan coating reflected in the coating thickness decrease. However, there was still plenty of the chitosan coating being observed on the surface of CFs. The fiber washed at pH 6.0 showed similar surface appearance as the coated ones, but when the pH decreased to 4.5, there were barely coatings left. The removal of the coating may be attributed to the oxidative degradation of chitosan and its enhanced solubility at higher surface charge density at more acidic condition. Since the CFs washed at pH 4.5 gave a significant change on the surface morphology, this fiber and water washed one were selected for single filament pull-out testing to analyze the interfacial properties. With the chitosan coating, the interface shear strength (IFSS) was raised up to 43.5 MPa compared to 39.2 MPa of unsized CF. The water wash removed the weak bonded coating layer and decreased the thickness of the coating, leading to an increased load transfer efficiency. As a result, the IFSS was enhanced by 32.4% compared to the unsized CF, increased from 39.2 MPa (unsized CF) to 51.9 MPa (water washed). After the electrochemical oxidation at the acidic condition, there was no chitosan coating on the CF surface and the IFSS dropped back to the similar result as the unsized CF.

CONCLUSION

To improve the interfacial properties between CFs and epoxy, chitosan (a biomaterial) was deposited onto the surface of CFs within the electrochemical processing step. The chitosan-based electrolyte was prepared with three different pH values to adjust the chitosan dispersion and charge densities at very dilute chitosan suspension in water (0.01 wt. %). Because of different charges carried on the surface of CFs and chitosan, the positively charged chitosan particles were accumulated around the CF cathode, and the reactions between amine groups (from chitosan) and epoxy matrix were promoted during composite preparation via curing. The coating properties were adapted by varying the current density and processing time. At an optimized condition, 0.1 A, 45 s, pH 4.5, the ILSS was improved by 18.1%, and the deviation of the interfacial properties decreased by 81.0% compared to untreated CFs. In the studied composites, it also performed better (with 27.7% improvement in ILSS) than commercial sized CFs.

The single filament test of the original CF and chitosan deposition CFs proved that the mechanical properties of the fiber did not change after the treatment, which indicated all the enhancement of ILSS came from improved interaction with the matrix at the interface. The acidic electrolyte without chitosan was also prepared to confirm that the improvements in interfacial properties were all from the chitosan coatings. Different epoxy matrices were investigated to demonstrate the broader use of chitosan coated fibers. The chopped fiber and epoxy composites were prepared to confirm the reinforcing effect of coated fibers in different forms. The chitosan coated fibers gave better tensile strength than the unsized and sized fibers. The washing step confirmed that the coating could be removed by reversed polarity electrochemical treatment at the acidic condition, which proved the recyclability of the coated fibers.

While there have been shown and described what are at present considered the preferred embodiments of the invention, those skilled in the art may make various changes and modifications which remain within the scope of the invention defined by the appended claims.

What is claimed is:

1. A surface-modified carbon fiber composition consisting of:

(i) a carbon fiber having an outer surface, a width of at least 1 micron, and a length-to-width aspect ratio of at least 1000;

(ii) an amine-containing polymer coating bonded to the outer surface of the carbon fiber, wherein the amine-containing polymer comprises chitosan; and optionally, (iii) a crosslinking agent which crosslinks the amine-containing polymer.

2. The carbon fiber composition of claim 1, wherein said carbon fiber is a continuous carbon fiber having a length of at least 1 meter.

3. The carbon fiber composition of claim 1, wherein said carbon fiber is a chopped segment of a continuous carbon fiber, wherein said chopped segment has a length of 0.1-10 cm.

4. The carbon fiber composition of claim 1, wherein said amine-containing polymer coating has a thickness of less than 2 microns (2000 nm).

5. The carbon fiber composition of claim 1, wherein said amine-containing polymer coating has a thickness of up to 0.5 microns (500 nm).

6. A carbon fiber composite material comprising surface-modified carbon fibers homogeneously incorporated into a polymer matrix, wherein the surface-modified carbon fiber consists of:

(i) a carbon fiber having an outer surface, a width of at least 1 micron, and a length-to-width aspect ratio of at least 1000;

(ii) an amine-containing polymer coating bonded to the outer surface of the carbon fiber, wherein the amine-containing polymer comprises chitosan; and optionally, (iii) a crosslinking agent which crosslinks the amine-containing polymer.

7. The carbon fiber composite material of claim 6, wherein the polymer matrix is an epoxy-based polymer.

8. The carbon fiber composite material of claim 6, wherein said amine-containing polymer coating has a thickness of less than 2 microns.

9. The carbon fiber composite material of claim 6, wherein said amine-containing polymer coating has a thickness of up to 0.5 microns.

10. A method for producing a surface-modified carbon fiber of claim 1 by an electrodeposition process, the method comprising immersing an uncoated carbon fiber in an electrolyte solution containing a dissolved amount of an amine-containing polymer containing at least one of primary and secondary amino groups while the uncoated carbon fiber is connected to a negatively charged electrode and positioned adjacent to a positively charged electrode in the electrolyte solution to result in the electrodeposition of a coating of the amine-containing polymer on the uncoated carbon fiber, wherein the carbon fiber has a width of at least 1 micron and a length-to-width aspect ratio of at least 1000.

11. The method of claim 10, wherein the uncoated carbon fiber is not subjected to a surface treatment prior to the electrodeposition of the amine-containing polymer on the carbon fiber.

12. The method of claim 10, further comprising, after electrodeposition of the amine-containing polymer onto the carbon fiber, washing the surface-modified carbon fiber to remove excess amine-containing polymer from the carbon fiber.

13. The method of claim 10, wherein said carbon fiber is a continuous carbon fiber having a length of at least 1 meter.

14. The method of claim 10, wherein said amine-containing polymer comprises chitosan.

15. The method of claim 10, wherein said amine-containing polymer coating has a thickness of less than 2 microns.

16. The method of claim 10, wherein said amine-containing polymer coating has a thickness of up to 0.5 microns.

17. The method of claim 10, wherein the electrolyte solution has a pH within a range of 2-6.

18. The method of claim 10, wherein the electrodeposition is conducted using an electrical current density within a range of 0.5 to 30 $A/m^2$.

19. The method of claim 10, wherein the electrodeposition is conducted using an electrical current density within a range of 0.5 to 15 $A/m^2$.

20. The method of claim 10, wherein the electrodeposition is conducted using an electrical current density within a range of 0.5 to 6 $A/m^2$.

21. The method of claim 10, wherein the electrodeposition is conducted for a period of time within a range of 5-120 seconds.

22. The method of claim 10, wherein the electrolyte solution contains 0.001-5 wt % concentration of the amine-containing polymer.

23. The method of claim 10, wherein the electrolyte solution contains 0.01-1 wt % concentration of the amine-containing polymer.

* * * * *